(12) United States Patent
Kikuchi

(10) Patent No.: US 7,733,266 B2
(45) Date of Patent: Jun. 8, 2010

(54) CONTROL TARGET RECOGNITION SYSTEM AND VEHICLE OBJECT DETECTION SYSTEM

(75) Inventor: Hayato Kikuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 85 days.

(21) Appl. No.: 12/204,289

(22) Filed: Sep. 4, 2008

(65) Prior Publication Data

US 2009/0069952 A1  Mar. 12, 2009

(30) Foreign Application Priority Data

Sep. 6, 2007 (JP) ............... 2007-231847
Sep. 6, 2007 (JP) ............... 2007-231848

(51) Int. Cl.
*G01S 13/00* (2006.01)
(52) U.S. Cl. ............... 342/70; 342/27; 342/28; 342/71; 342/72; 342/175
(58) Field of Classification Search .......... 342/70
See application file for complete search history.

(56) References Cited

U.S. PATENT DOCUMENTS

| 6,542,111 | B1 | 4/2003 | Wilson | |
|---|---|---|---|---|
| 6,661,370 | B2 * | 12/2003 | Kishida et al. ............. | 342/128 |
| 2003/0179129 | A1 | 9/2003 | Tamatsu | |

FOREIGN PATENT DOCUMENTS

| EP | 1 326 087 A2 | 7/2003 |
|---|---|---|
| EP | 1 347 306 A2 | 9/2003 |
| JP | 6-174847 A | 6/1994 |
| JP | 07-098375 A | 4/1995 |
| JP | 09-033642 A | 2/1997 |
| JP | 10 206532 A | 8/1998 |
| JP | 11 167699 A | 6/1999 |
| JP | 2001-116839 A | 4/2001 |
| JP | 2002-277537 A | 9/2002 |
| JP | 2003-075531 A | 3/2003 |
| JP | 2004-012198 A | 1/2004 |
| JP | 2004-053611 A | 2/2004 |
| JP | 2004-233085 A | 8/2004 |
| JP | 2005-030935 A | 2/2005 |
| JP | 2005-326296 A | 11/2005 |
| JP | 2007-024590 A | 2/2007 |
| JP | 2008-40646 A | 2/2008 |

* cited by examiner

*Primary Examiner*—Thomas H Tarcza
*Assistant Examiner*—Timothy A Brainard
(74) *Attorney, Agent, or Firm*—Arent Fox LLP

(57) ABSTRACT

There is provided a system in which when a gate having a reflection level of a threshold or higher and having been recognized as a control target by last time is not recognized as the control target this time, the gate is assumed to be actually detected, and extrapolation device extrapolates the gate (see ○) up to a predetermined number of times (five times), wherein when the gate is a stationary object, and a reflection level of the gate at the next detection (Time 6) predicted from a reflection level at the previous detection (Time 4) and a reflection level at the current detection (Time 5) is lower than a detection threshold (see □), the limit of the number of extrapolations by the extrapolation device is reduced from five to two. Thus, the number of extrapolations is reduced of the gate whose reflection level is suddenly reduced as a subject vehicle approaches and that is estimated not to be a control target, and unnecessary vehicle control for the gate can be prevented to eliminate discomfort of a driver.

9 Claims, 33 Drawing Sheets

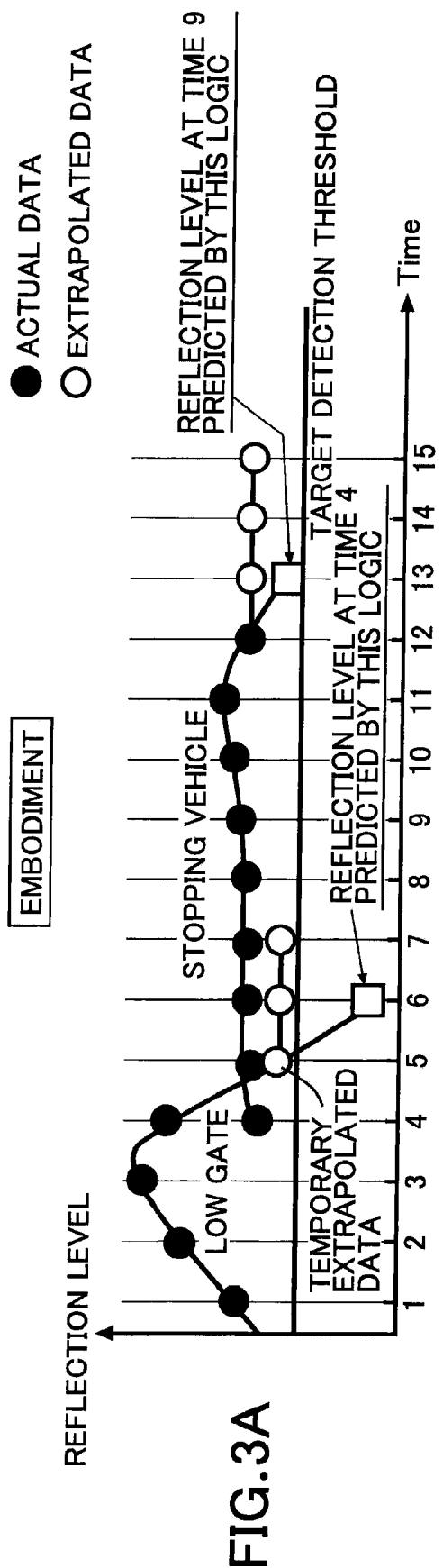
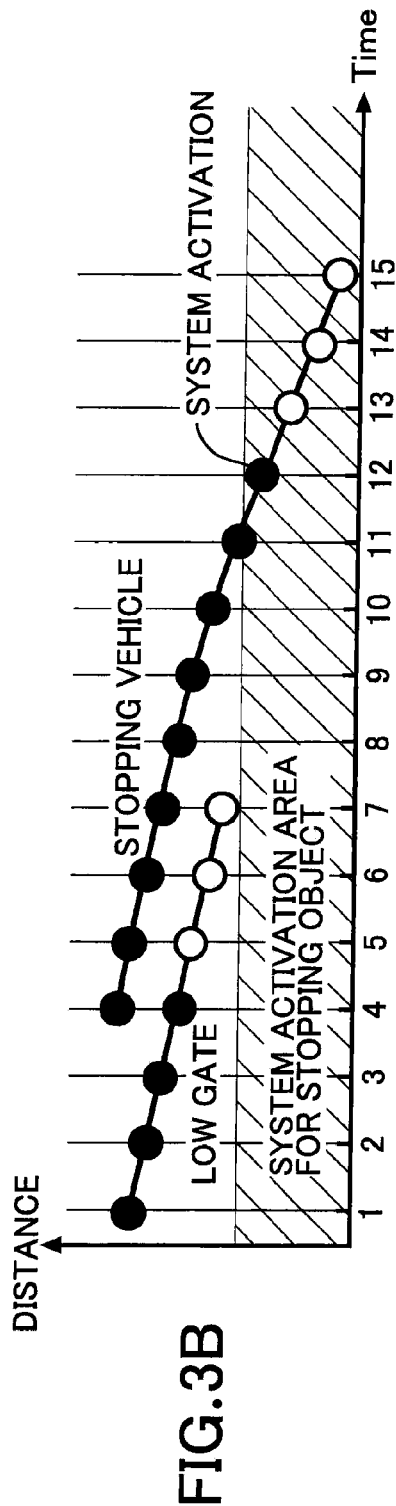
FIG.3A
FIG.3B

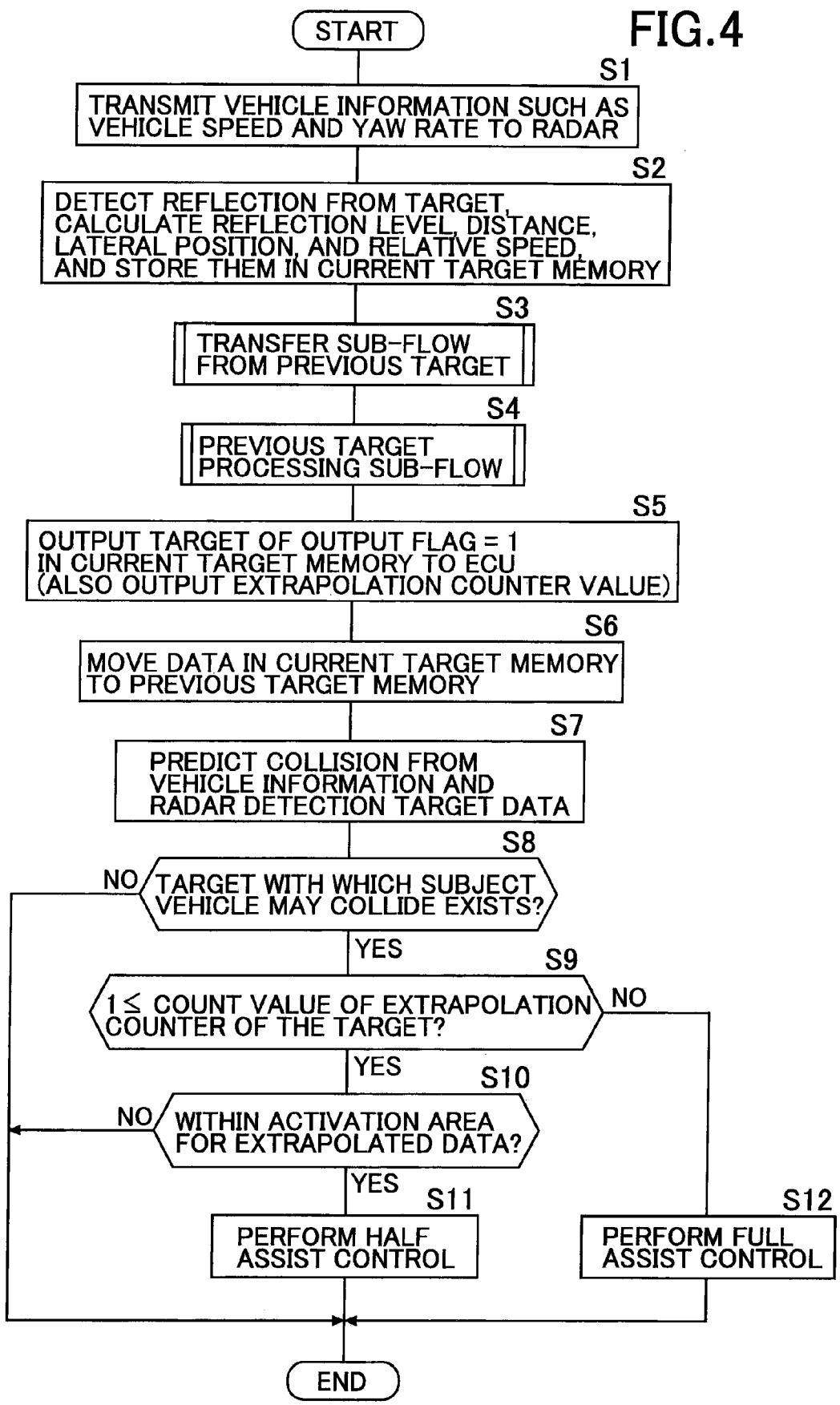

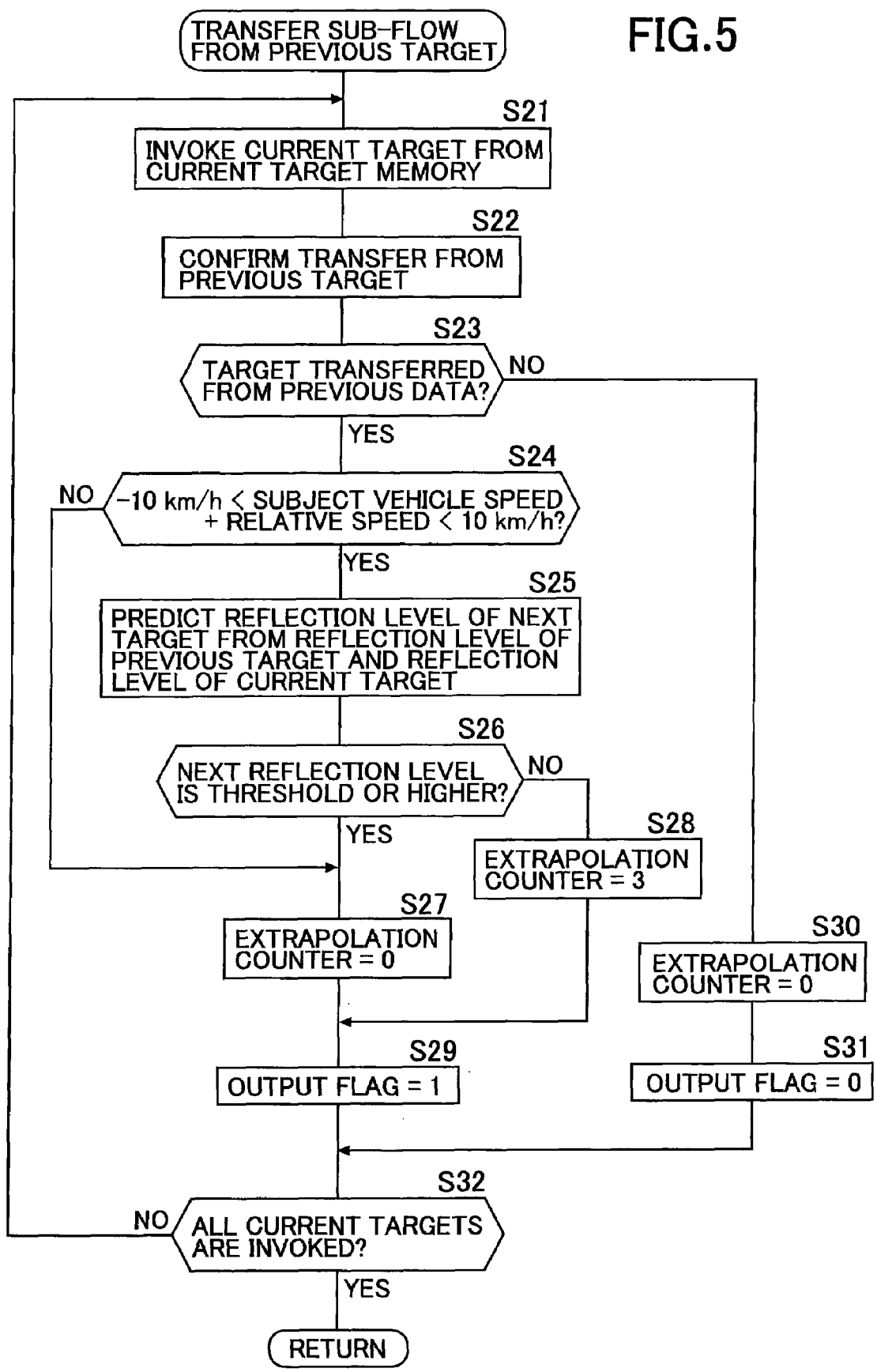

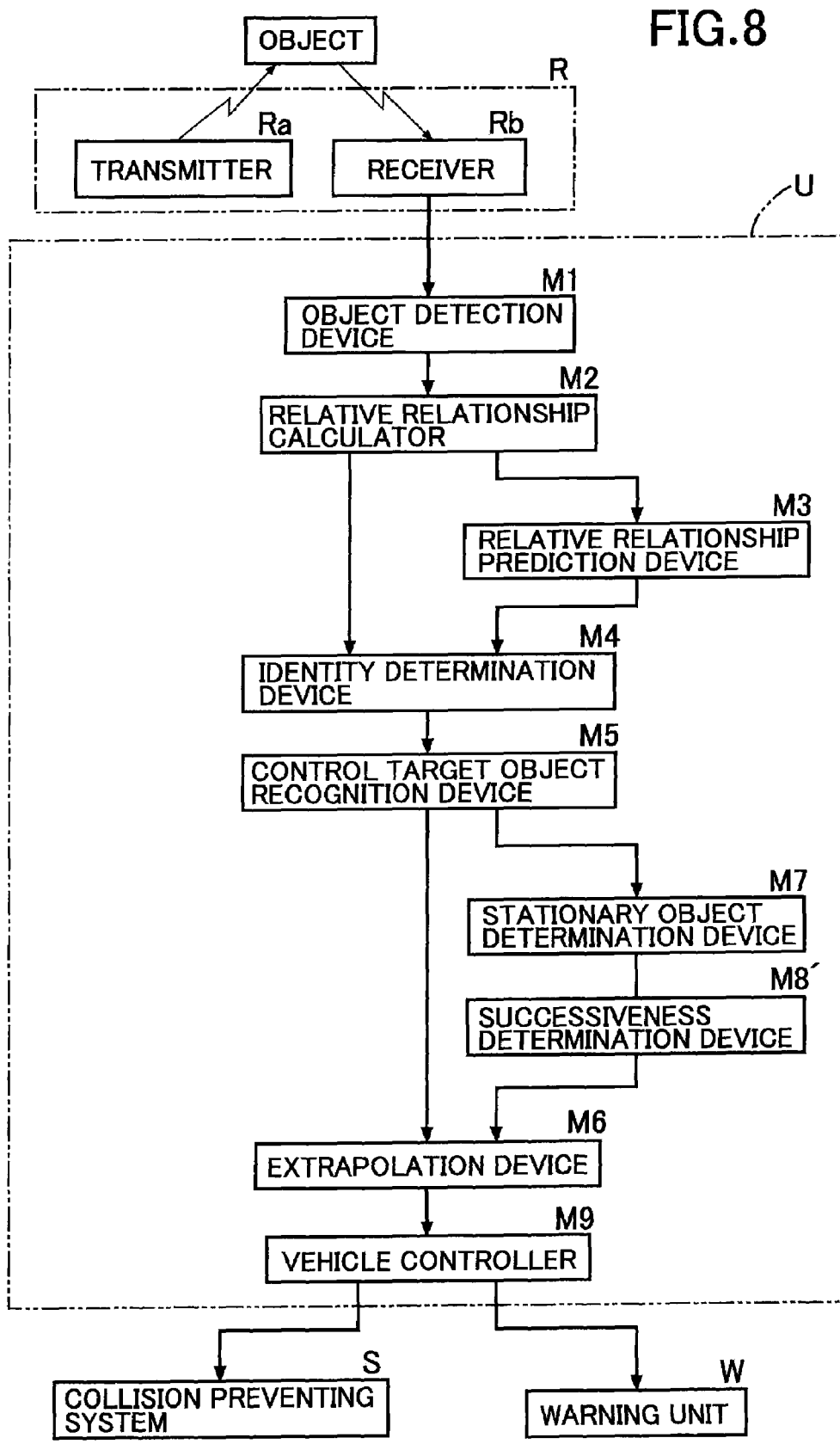

Time-2

CONVENTIONAL LOGIC

LOGIC OF THE PRESENT INVENTION

Time-3

CONVENTIONAL LOGIC

LOGIC OF THE PRESENT INVENTION

FIG.13A  Time-4
CONVENTIONAL LOGIC
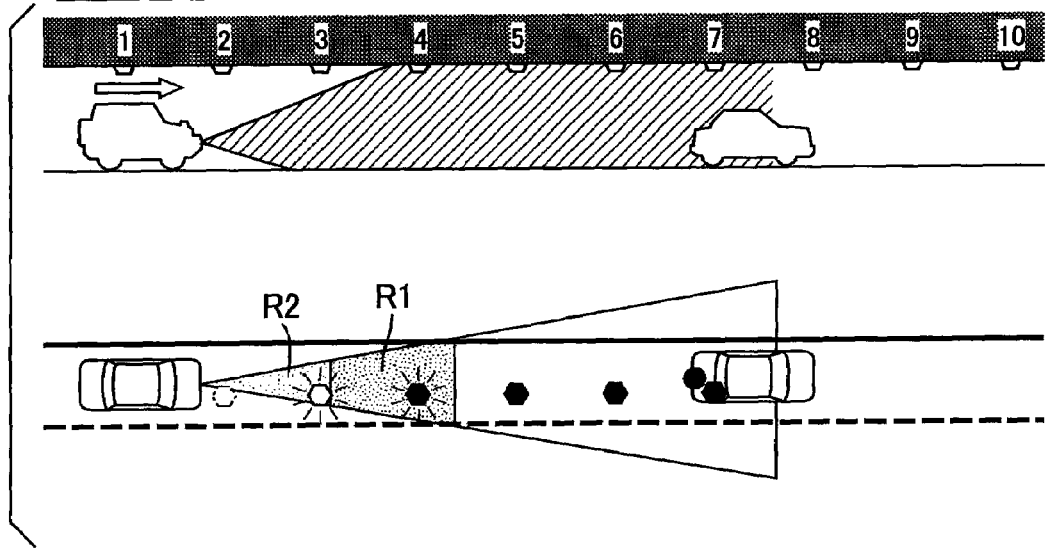
FIG.13B
LOGIC OF THE PRESENT INVENTION
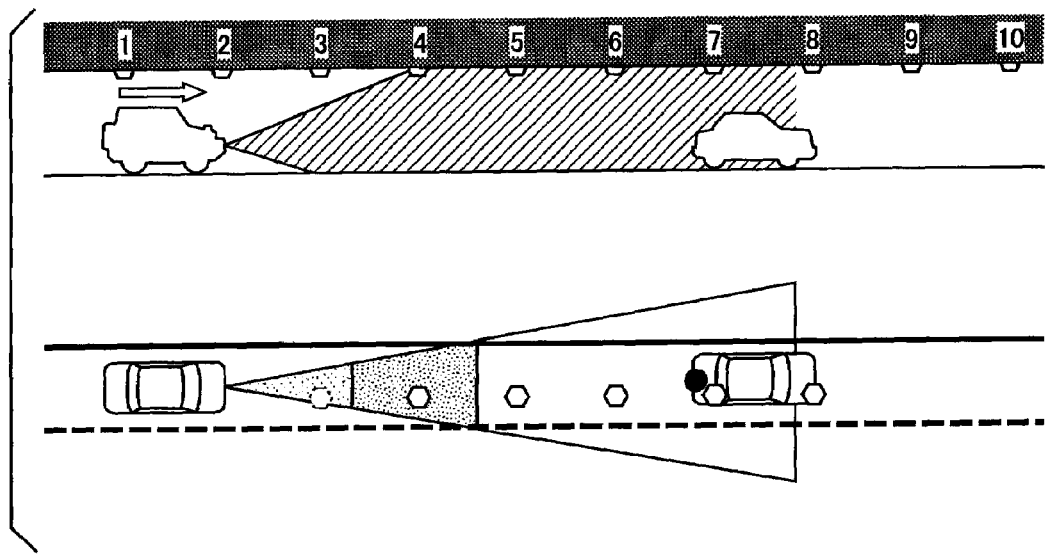

Time-5

CONVENTIONAL LOGIC

LOGIC OF THE PRESENT INVENTION

FIG.15A  Time-6
CONVENTIONAL LOGIC
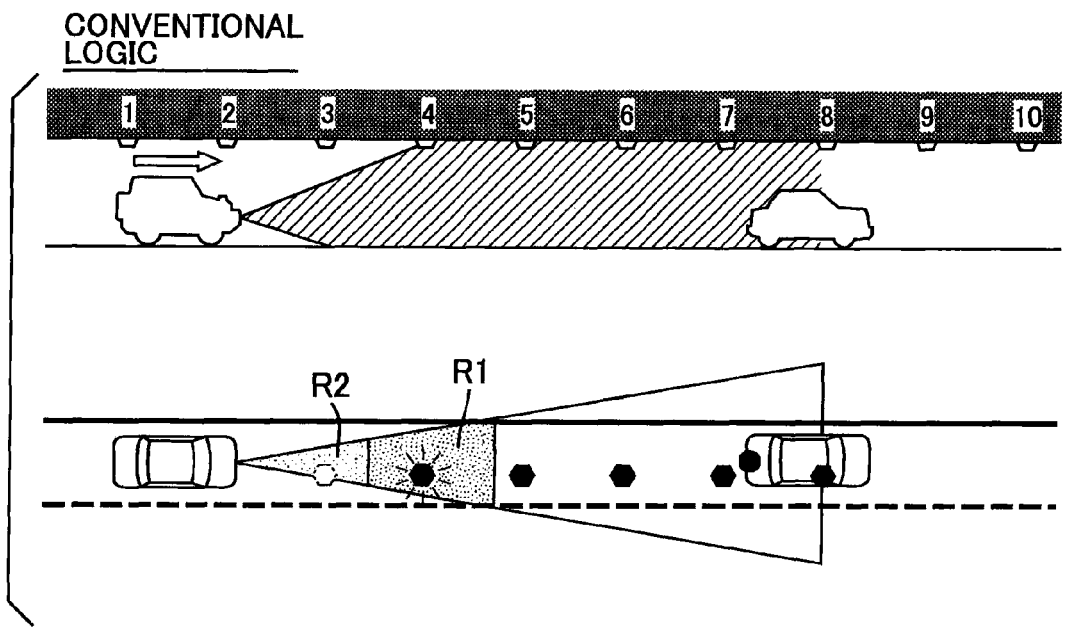
FIG.15B
LOGIC OF THE PRESENT INVENTION
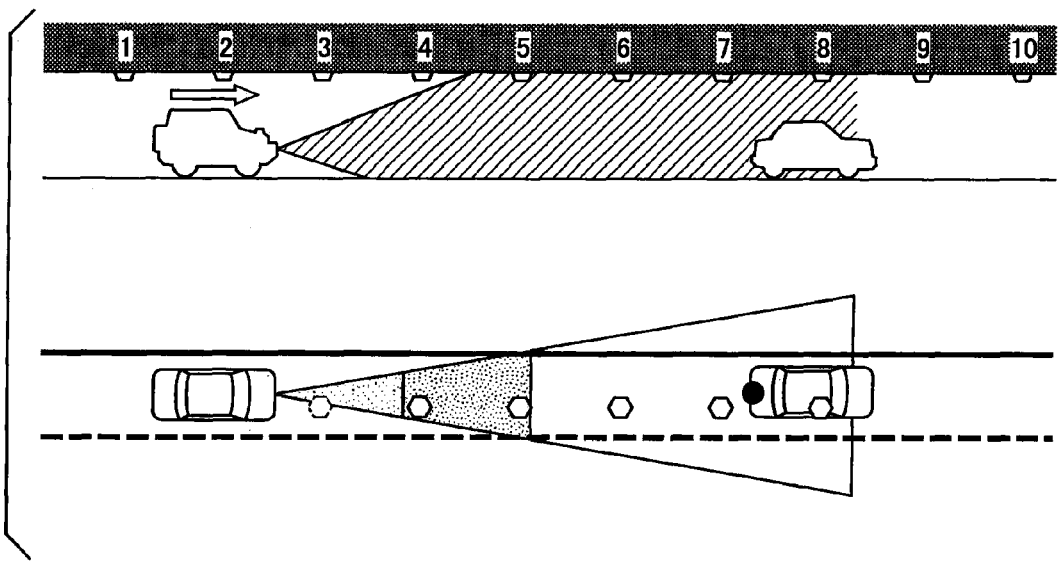

Time-7

CONVENTIONAL LOGIC

LOGIC OF THE PRESENT INVENTION

CONVENTIONAL LOGIC

Time-8

LOGIC OF THE PRESENT INVENTION

Time-9

CONVENTIONAL LOGIC

LOGIC OF THE PRESENT INVENTION

CONVENTIONAL LOGIC

Time-10

LOGIC OF THE PRESENT INVENTION

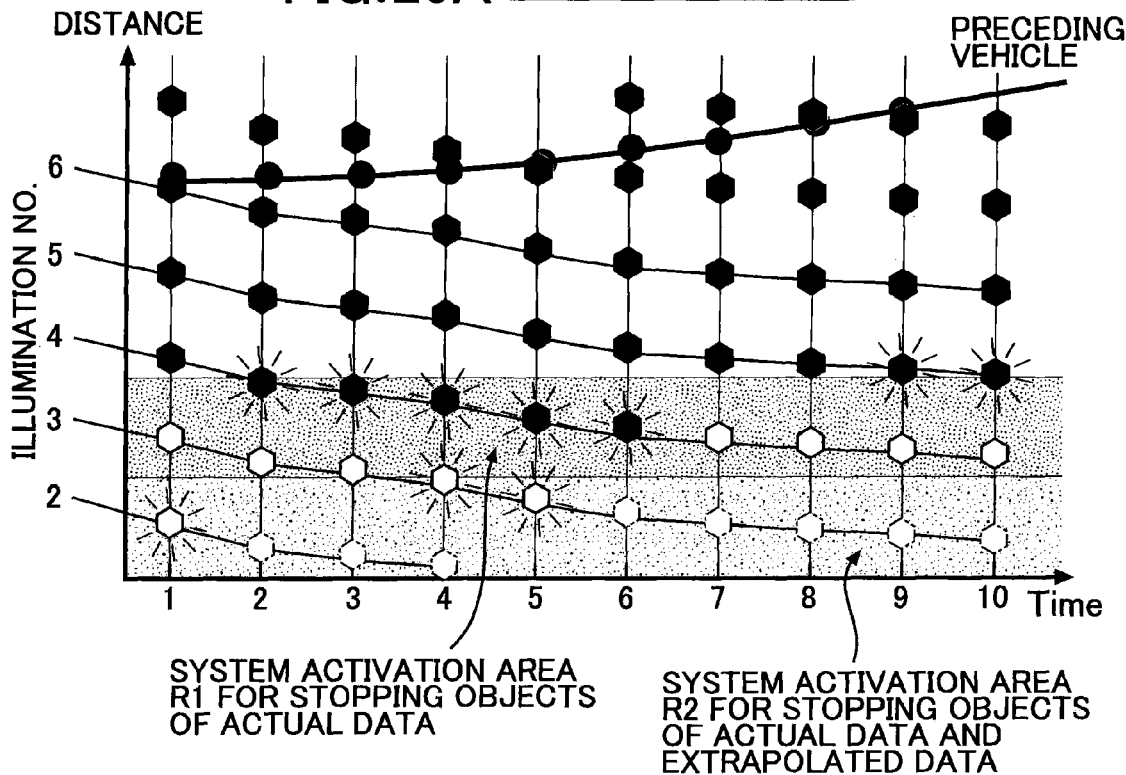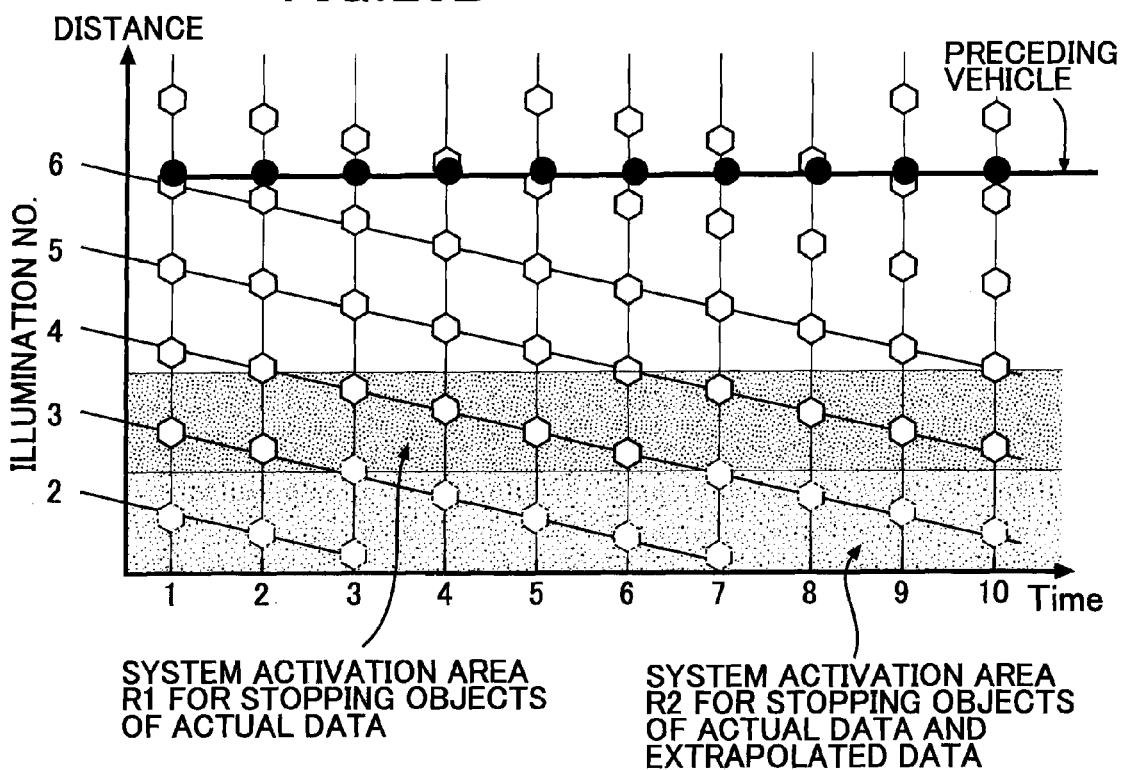

FIG.21A
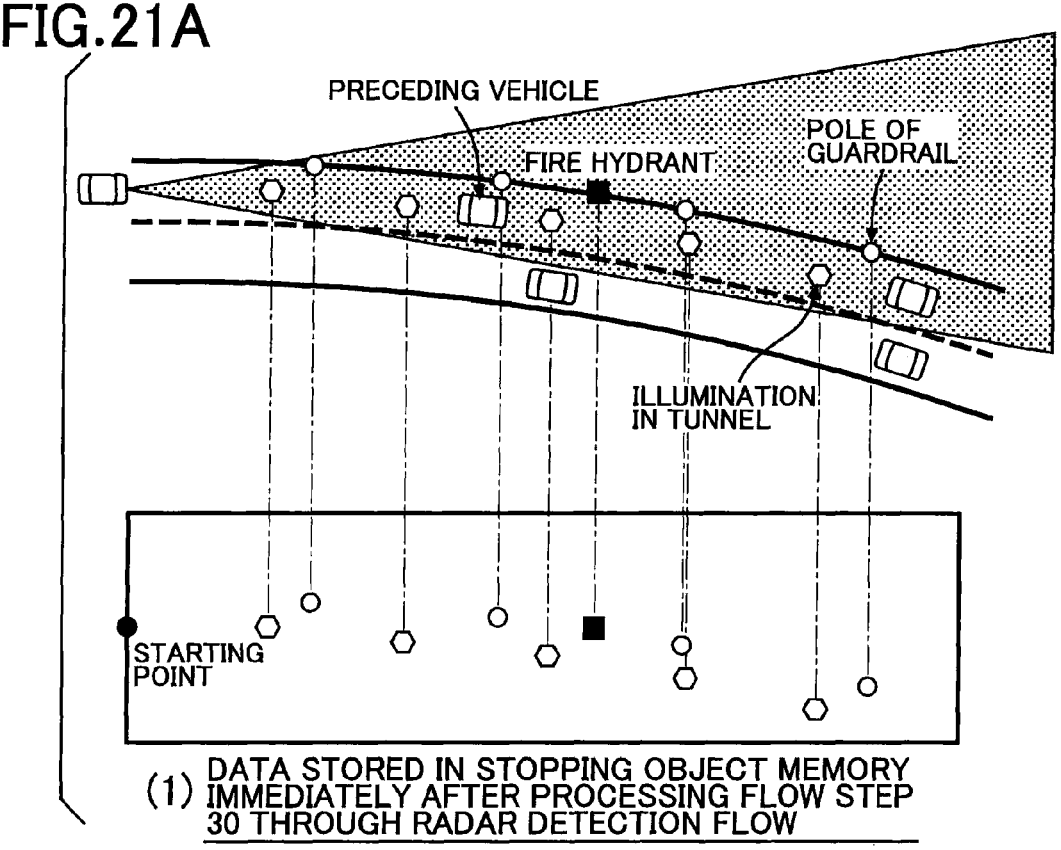
(1) DATA STORED IN STOPPING OBJECT MEMORY IMMEDIATELY AFTER PROCESSING FLOW STEP 30 THROUGH RADAR DETECTION FLOW
FIG.21B
(2) SELECT CLOSEST TARGET AS FIRST TARGET AND SELECT SECOND TARGET LATERALLY CLOSEST TO FIRST TARGET WITHIN 20 m
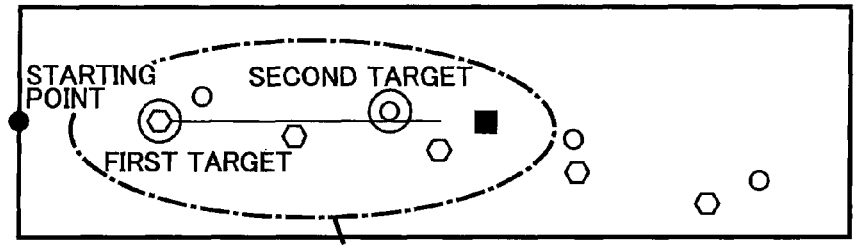
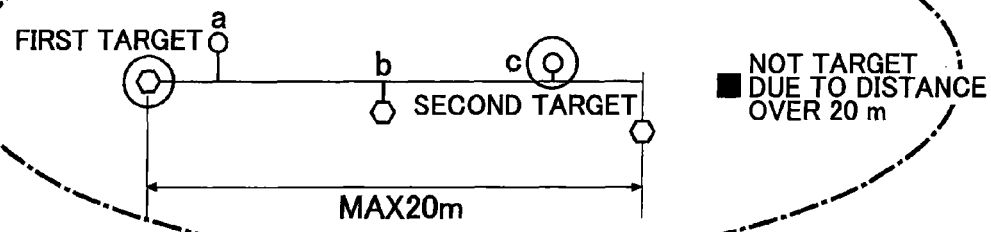

(3) CALCULATE FIRST VECTOR FROM FIRST TARGET TO SECOND TARGET

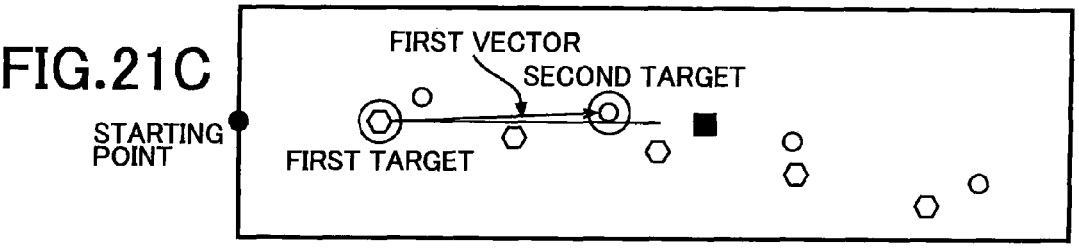

FIG.21C (4) EXTEND FIRST VECTOR WITH SECOND TARGET BEING STARTING POINT, AND SELECT THIRD TARGET CLOSEST TO ENDPOINT

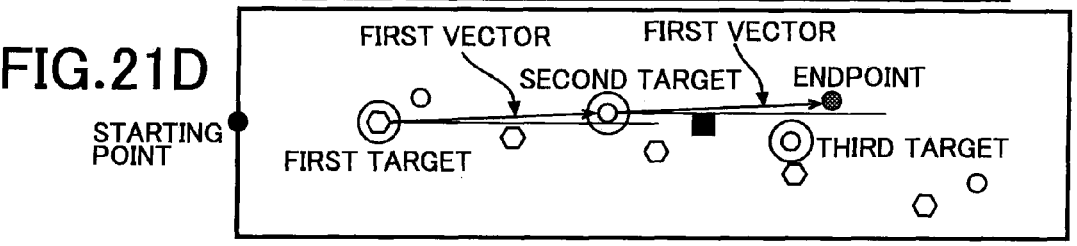

FIG.21D (5) DETERMINE WHETHER THIRD TARGET EXISTS WITHIN RANGE OF ± 2 m IN FRONT-REAR AND LEFT-RIGHT DIRECTIONS FROM ENDPOINT OF EXTENDED FIRST VECTOR

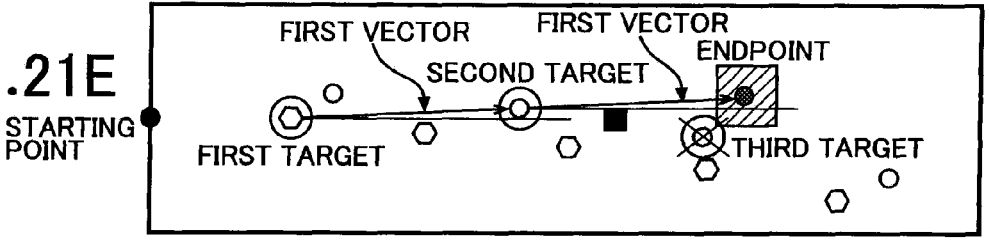

FIG.21E (6) IN THIS EXAMPLE, THIRD TARGET IS BEYOND RANGE AND "NO", AND THUS RETURNING TO (2), NEWLY SELECT TARGET LATERALLY SECOND CLOSEST AS SECOND TARGET

FIG.21F (7) CALCULATE FIRST VECTOR FROM FIRST TARGET TO SECOND TARGET

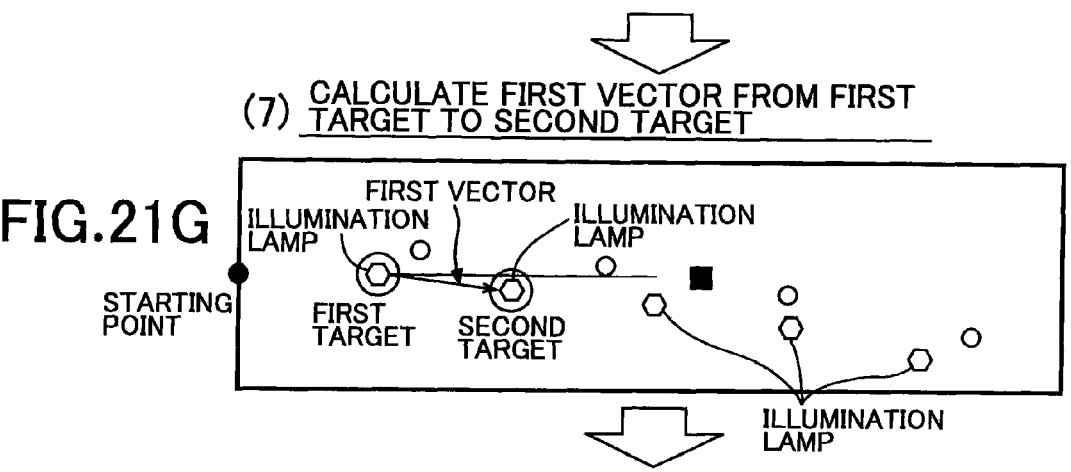

FIG.21G (8) EXTEND FIRST VECTOR WITH SECOND TARGET BEING STARTING POINT, AND SELECT THIRD TARGET CLOSEST TO ENDPOINT

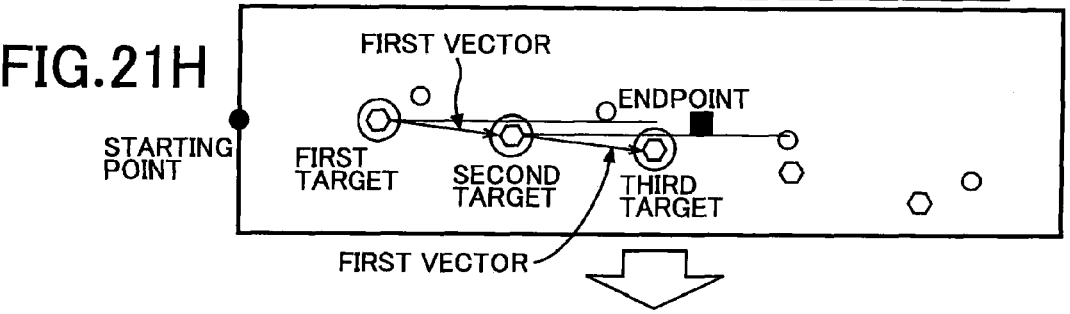

FIG.21H (9) DETERMINE WHETHER THIRD TARGET EXISTS WITHIN RANGE OF ±2 m IN FRONT-REAR AND LEFT-RIGHT DIRECTIONS FROM ENDPOINT OF EXTENDED FIRST VECTOR

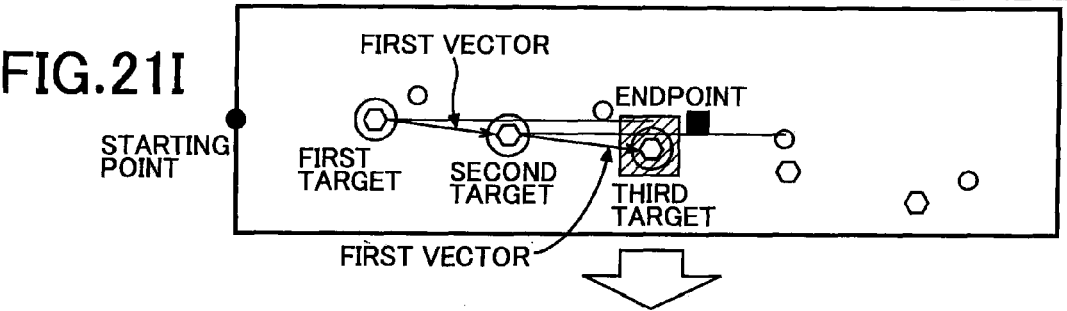

FIG.21I

(10) IN THIS EXAMPLE, THIRD TARGET IS WITHIN RANGE AND "YES", AND THUS NEWLY CALCULATE VECTOR FROM SECOND TARGET TO THIRD TARGET

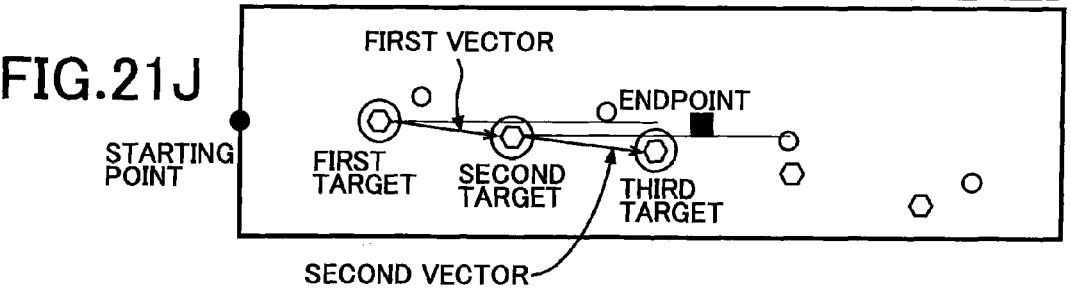

FIG.21J

(11) REPEAT (8) AND (9) WITH THIRD TARGET BEING STARTING POINT UNTIL SUCCESSIVENESS IS NOT ACHIEVED

FIG.21K
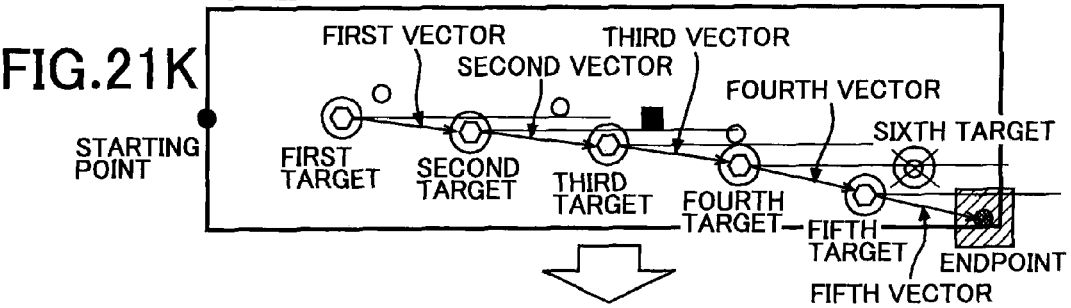

(12) CHANGE EXTRAPOLATION FLAGS OF FIRST TO FIFTH TARGETS WHOSE SUCCESSIVENESS IS ACHIEVED TO 3 AND MOVE THEM TO CURRENT MEMORY (REMOVE THEM FROM STOPPING OBJECT MEMORY)

FIG.21L
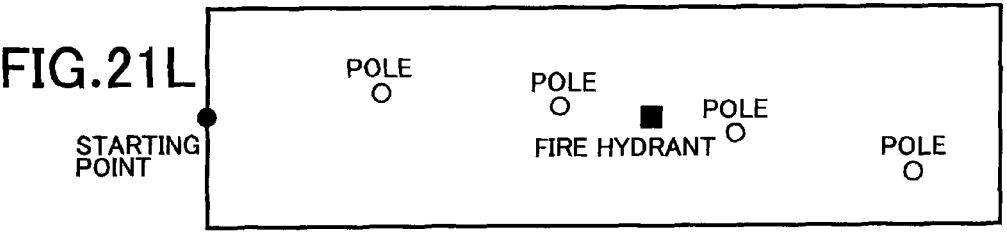

(13) PERFORM (2) TO (10) FOR REMAINING TARGETS

FIG.21M
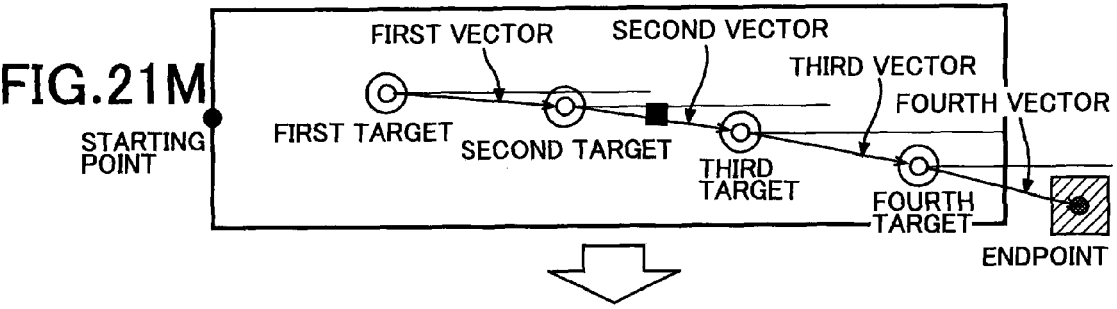

(14) CHANGE EXTRAPOLATION FLAGS OF FIRST TO FOURTH TARGETS WHOSE SUCCESSIVENESS IS ACHIEVED TO 3 AND MOVE THEM TO CURRENT MEMORY (REMOVE THEM FROM STOPPING OBJECT MEMORY)

FIG.21N
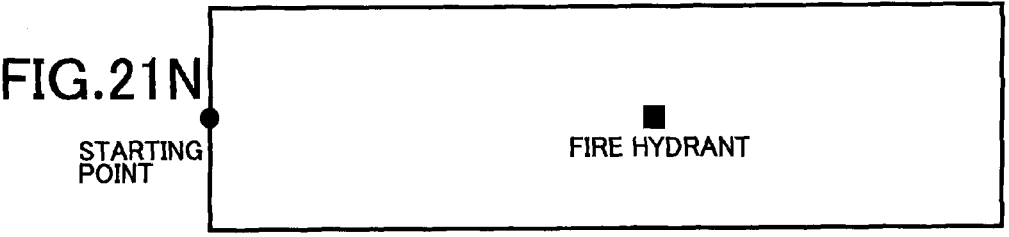

FIG. 21O

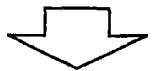

(15) REPEAT (2) TO (13) UNTIL SUCCESSIVENESS IS NOT ACHIEVED. IN THIS EXAMPLE, ONLY ONE TARGET REMAINS AND DETERMINATION IS FINISHED

FIG. 21P

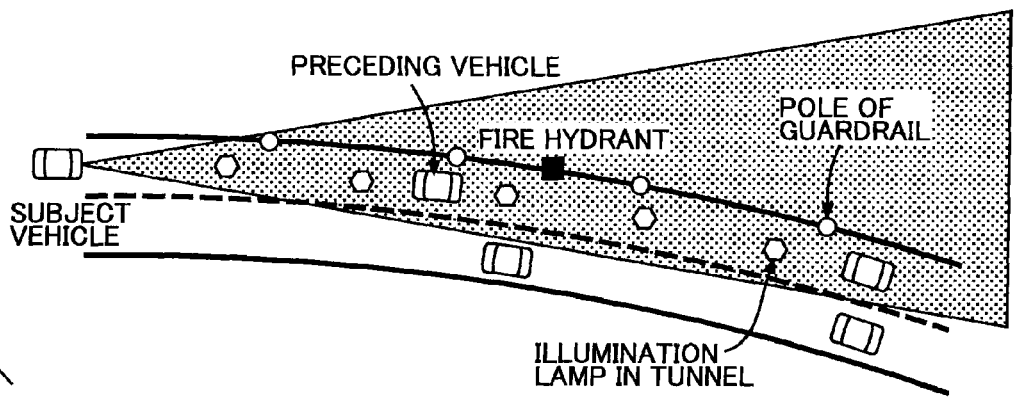

(STATE AFTER SUCCESSIVENESS DETERMINATION OF STOPPING OBJECT)
FOR ILLUMINATION LAMPS IN TUNNEL AND POLES OF GUARDRAIL WHOSE SUCCESSIVENESS IS ACHIEVED, EXTRAPOLATION FLAG IS 3, AND SINGLE FIRE HYDRANT WITHOUT SUCCESSIVENESS REMAINS AS STOPPING OBJECT REAL IMAGE DATA

CONTROL TARGET RECOGNITION SYSTEM AND VEHICLE OBJECT DETECTION SYSTEM

BACKGROUND OF THE INVENTION

1. Field of the Invention

The present invention relates to a control target recognition system that detects an object on the basis of a reflected wave having a reflection level of a detection threshold or higher among reflected waves transmitted by a transmitter and received by a receiver, and recognizes a control target of a subject vehicle on the basis of a detection result of the object.

The present invention also relates to a vehicle object detection system that detects objects on the basis of a reflected wave having a reflection level of a detection threshold or higher among reflected waves transmitted by a transmitter and received by a receiver, and further detects an object to be a control target of a subject vehicle among the objects.

2. Description of the Related Art

Such art is known from Japanese Patent Application Laid-open No. 6-174847 that when an obstacle detected by a radar device is temporarily out of detection, information on the obstacle is estimated for a predetermined time thereafter on the basis of information on the obstacle that has been stored in a storage device theretofore, and a possibility that a subject vehicle may come into contact with the obstacle is determined on the basis of the estimated information.

Also, Japanese Patent Application Laid-open No. 2008-40646 (Japanese Patent Application No. 2006-211839: filed on Aug. 3, 2006) by the same inventor proposes, in a second embodiment, a system for performing automatic deceleration or warning for avoiding a collision with a stopping object located forward of the subject vehicle such as a low gate through which a subject vehicle can pass or a preceding vehicle, in which when the stopping object is not detected as a target, an extrapolation processing (predicting a future position or the like of the undetected target, and handling the target as if it has been detected) is performed five times thereafter, thereby allowing automatic deceleration or warning for avoiding a collision to be carried out without any trouble even when the target is temporarily undetectable.

Next, with reference to FIGS. 7A to 7J, problems of the system proposed in Japanese Patent Application Laid-open No. 2008-40646 will be described. In FIGS. 7A to 7J, ● denotes actual data and ○ denotes extrapolated data.

FIG. 7A shows a state of Time 1 where a low gate as a stopping object through which a subject vehicle can pass is located forward of the subject vehicle, and a stopping vehicle as a stopping object is located forward of the gate. In this case, the subject vehicle is unlikely to collide with the gate through which the subject vehicle can pass, and thus collision avoiding control only for the stopping vehicle is desirably performed.

Electromagnetic waves are transmitted forward from a radar device mounted in the subject vehicle, reflection levels of reflected waves from the gate and the stopping vehicle are compared with a detection threshold, and a stopping object having a reflection level of a reflected wave of the detection threshold or higher is a target of the collision avoiding control such as automatic braking or warning. In FIG. 7A, a reflection level of the gate closer to the subject vehicle is the detection threshold or higher, but the distance of the gate is beyond an activation area of the collision avoiding control, and thus the collision avoiding control such as automatic braking or warning is not performed. Also, the stopping vehicle is distant and thus the reflection level of the reflected wave is lower than the detection threshold, and collision avoiding control for the stopping vehicle is naturally not performed.

At Time 4 in FIG. 7B, besides the reflection level of the reflected wave of the gate, the reflection level of the reflected wave of the stopping vehicle becomes the detection threshold or higher, but the distances of the gate and the stopping vehicle are beyond the activation area of the collision avoiding control, and thus the collision avoiding control such as automatic braking or warning for the gate and the stopping vehicle is not performed.

At Time 5 in FIG. 7C, the subject vehicle further approaches the gate, and most of the electromagnetic waves from the radar device pass through the inside of the gate to reduce the reflection level of the reflected wave of the gate, but the reflection level is still the detection threshold or higher, and the state at Time 4 in FIG. 7B is continued.

At Time 6 in FIG. 7D, the subject vehicle further approaches the gate, the reflection level of the reflected wave becomes lower than the detection threshold and the gate is lost sight of (undetectable), and thus a first extrapolation processing for predicting a position of the gate is performed. Also at this time, the distances of the extrapolated gate and the stopping vehicle are beyond the activation area of the collision avoiding control, and thus the collision avoiding control such as automatic braking or warning for the gate and the stopping vehicle is not performed.

At Time 7 in FIG. 7E, the gate is still lost sight of, and thus a second extrapolation processing for predicting the position of the gate is performed. Also at this time, the distances of the extrapolated gate and the stopping vehicle are beyond the activation area of the collision avoiding control, and thus the collision avoiding control such as automatic braking or warning for the gate and the stopping vehicle is not performed.

At Time 8 in FIG. 7F, the gate is still lost sight of, and thus a third extrapolation processing for predicting the position of the gate is performed. In this case, the distance of the extrapolated gate is within the activation area of the collision avoiding control, and thus the collision avoiding control such as automatic braking or warning is performed for avoiding a collision with the gate. However, the gate is the stopping object through which the subject vehicle can pass and does not require the collision avoiding control, and thus unnecessary collision avoiding control is performed.

At this time, the collision avoiding control is not automatic braking but warning, and if a driver ignores the warning and advances the subject vehicle, at Time 11 in FIG. 7G, the stopping vehicle enters the activation area of the collision avoiding control, and thus collision avoiding control such as automatic braking or warning for the stopping vehicle is performed.

At Time 12 in FIG. 7H, the stopping vehicle is still detected within the activation area of the collision avoiding control, and thus the collision avoiding control is continued as it is.

At Time 13 in FIG. 7I, the subject vehicle further approaches the stopping vehicle, and thus the stopping vehicle is laterally beyond a detection area of the radar device and the reflection level becomes lower than the detection threshold, and a first extrapolation processing is performed. Then, the collision avoiding control is continued as it is on the basis of first extrapolated data.

At Time 14 in FIG. 7J, a second extrapolation processing is performed, and the collision avoiding control is continued as it is on the basis of second extrapolated data.

Thus, in the conventional system, the extrapolation processing is uniformly successively performed up to five times while the obstacle is lost sight of. Thus, if the extrapolation processing is successively performed up to five times for the stopping object such as the low gate through which the subject vehicle can pass, excessive collision avoiding control may be performed at Time 8 in FIG. 7F, which may provide discomfort to the driver.

Next, with reference to FIGS. 10A to 20B, problems that may occur when the conventional extrapolation processing is performed will be described. In FIGS. 10A to 20B, "A" shows a conventional example, and "B" shows an embodiment.

In a supposed situation, a subject vehicle runs following a preceding vehicle in a tunnel in which illumination lamps as stopping objects are provided on a ceiling at regular intervals, and when the subject vehicle approaches the preceding vehicle and a relative distance therebetween detected by a radar device provided in the subject vehicle becomes lower than a predetermined value, automatic braking of the subject vehicle or warning to the driver is performed to avoid contact therebetween. The radar device has a detection area (hatched area) with a wider lateral width on a more forward side, and in the detection area, a system activation area R2 for stopping objects of actual data and extrapolated data is set in a section closest to the subject vehicle, and a system activation area R1 for a stopping object of the actual data is set forward of the system activation area R2.

The actual data is data actually detected by the radar device, and the extrapolated data is data of a virtual object inserted by a prediction from past actual data so as to prevent an interruption of system activation when the radar device temporarily loses sight of an object. In the conventional example, the extrapolated data is inserted up to five times, and if the extrapolated data is not transferred to the actual data after five extrapolations, the extrapolated data disappears at the time. Thus, with the extrapolated data, vehicle control such as automatic braking or warning is performed on the basis of the extrapolated data as well as the actual data.

In the example in FIGS. 10A to 20B, if an illumination lamp is located within the hatched detection area of the radar device, the illumination lamp is actual data (see the black hexagon), and if the illumination lamp is beyond and backward of the detection area as the subject vehicle runs, the illumination lamp is extrapolated data (see the white hexagon). If five extrapolations are performed by last time, extrapolation is not performed this time, and data (see the hexagon shown by the broken line) disappears.

The radar device also detects the preceding vehicle, and vehicle control such as automatic braking or warning for the preceding vehicle as a moving object is of course performed. The vehicle control for the moving object is not directly related to the present invention directed to a stopping object, and thus details thereof will be omitted.

FIGS. 10A to 19A correspond to Times 1 to 10 with the lapse of time, and serial numbers 1 to 10 are assigned to the illumination lamps from a side of the subject vehicle to a forward side.

At Time 1 in FIG. 10A, the fourth illumination lamp and thereafter are located within the detection area of the radar device and are actual data (black hexagons), and the second and third illumination lamps are extrapolated data (white hexagons). As is apparent from FIGS. 10A and 20A together, actual data does not exist in the system activation area R1 for the stopping object of the actual data, but the extrapolated data of the third illumination lamp exists in the system activation area R2 for the stopping objects of the actual data and the extrapolated data, and thus unnecessary vehicle control such as automatic braking or warning is performed for the third illumination lamp as a control target.

At Time 2 in FIG. 11A and Time 3 in FIG. 12A, the fourth illumination lamp exists in the system activation area R1 for the stopping object of the actual data, and thus unnecessary vehicle control such as automatic braking or warning is performed for the fourth illumination lamp as a control target.

At Time 4 in FIG. 13A and Time 5 in FIG. 14A, actual data of the fourth illumination lamp exists in the system activation area R1 for the stopping object of the actual data, and the extrapolated data of the third illumination lamp exists in the system activation area R2 for the stopping objects of the actual data and the extrapolated data, and thus unnecessary vehicle control such as automatic braking or warning is performed for the third and fourth illumination lamps as control targets.

At Time 6 in FIG. 15A, the actual data of the fourth illumination lamp exists in the system activation area R1 for the stopping object of the actual data, and thus unnecessary vehicle control such as automatic braking or warning is performed for the fourth illumination lamp as a control target.

At Time 7 in FIG. 16A and Time 8 in FIG. 17A, actual data does not exist in the system activation area R1 for the stopping object of the actual data, and neither actual data nor extrapolated data exists in the system activation area R2 for the stopping objects of the actual data and the extrapolated data, and thus vehicle control is not performed.

At Time 9 in FIG. 18A and Time 10 in FIG. 19A, actual data of the fifth illumination lamp exists in the system activation area R1 for the stopping object of the actual data, and thus unnecessary vehicle control such as automatic braking or warning is performed for the fifth illumination lamp as a control target.

As described above, in the conventional example in which the number of extrapolations is set to five, unnecessary vehicle control is intermittently performed for an illumination lamp with which the subject vehicle is unlikely to come into contact as a control target, which provides discomfort to the driver.

To solve this problem, the number of extrapolations can be reduced from five to, for example, two. However, if the number of extrapolations is reduced for all the control targets, a new problem may occur that necessary vehicle control is not performed when a control target is temporarily lost sight of.

SUMMARY OF THE INVENTION

The present invention is achieved in view of the above described circumstances, and has an object to prevent unnecessary vehicle control for a stopping object that is not an obstacle to running of a subject vehicle.

In order to achieve the object, according to a first feature of the present invention, there is provided a control target recognition system comprising: a transmitter for transmitting electromagnetic waves toward a predetermined detection area at a predetermined time interval; a receiver for receiving reflected waves that are the electromagnetic waves transmitted by the transmitter and reflected by an object; an object detection device for detecting the object on the basis of a reflected wave having a reflection level of a detection threshold or higher among the reflected waves received by the receiver; a relative relationship calculator for calculating a relative relationship between a subject vehicle and the object on the basis of a detection result of the object detection device; a relative relationship prediction device for predicting a current relative relationship on the basis of the relative relationship calculated last time by the relative relationship calculator; an identity determination device for comparing the relative relationship predicted this time by the relative relationship prediction device with the relative relationship calculated this time by the relative relationship calculator, and determining that an object detected last time is identical to an object detected this time; a control target object recognition device for recognizing, as a control target object, an object when the object is determined to be identical by the identity determination device a predetermined number of times; an extrapolation device for assuming that the object predicted by the relative relationship prediction device is actually detected and extrapolating the object up to a predetermined number of times, when an object that has been recognized as a control target by the control target object recognition device by last time is not recognized as the control target this time; a stationary object determination device for determining whether the object recognized as the control target is a stationary object; and a reflection level prediction device for predicting a reflection level of the object recognized as the control target at a next detection from a reflection level at a previous detection and a reflection level at a current detection, wherein the extrapolation device reduces the limit of the number of extrapolations when the object is the stationary object, and when the predicted reflection level is lower than the detection threshold.

With the above described configuration, when the object that has been recognized as the control target by the control target object recognition device by last time is not recognized as the control target this time, the extrapolation device assumes that the object predicted by the relative relationship prediction device is actually detected and extrapolates the object up to the predetermined number of times. When the object is the stationary object, and the reflection level of the object at the next detection predicted from the reflection level at the previous detection and the reflection level at the current detection is lower than the detection threshold, the limit of the number of extrapolations by the extrapolation device is reduced. Thus, the number of extrapolations is reduced of the object whose reflection level is suddenly reduced and that is estimated not to be a control target, and unnecessary vehicle control for the object can be prevented to eliminate discomfort of a driver.

According to a second feature of the present invention, in addition to the first feature, the extrapolation device reduces the limit of the number of extrapolations with increase in vehicle speed of the subject vehicle.

With the above described configuration, the extrapolation device reduces the limit of the number of extrapolations with increase in vehicle speed of the subject vehicle. Thus, even if the extrapolated data suddenly approaches the subject vehicle during extrapolation at a high vehicle speed of the subject vehicle, unnecessary vehicle control can be prevented.

According to a third feature of the present invention, there is provided a control target recognition system comprising: a transmitter for transmitting electromagnetic waves toward a predetermined detection area at a predetermined time interval; a receiver for receiving reflected waves that are the electromagnetic waves transmitted by the transmitter and reflected by an object; an object detection device for detecting the object on the basis of a reflected wave having a reflection level of a detection threshold or higher among the reflected waves received by the receiver; a relative relationship calculator for calculating a relative relationship between a subject vehicle and the object on the basis of a detection result of the object detection device; a relative relationship prediction device for predicting a current relative relationship on the basis of the relative relationship calculated last time by the relative relationship calculator; an identity determination device for comparing the relative relationship predicted this time by the relative relationship prediction device with the relative relationship calculated this time by the relative relationship calculator, and determining that an object detected last time is identical to an object detected this time; a control target object recognition device for recognizing, as a control target object, an object when the object is determined to be identical by the identity determination device a predetermined number of times; an extrapolation device for assuming that the object predicted by the relative relationship prediction device is actually detected and extrapolating the object up to a predetermined number of times, when an object that has been recognized as a control target by the control target object recognition device by last time is not recognized as the control target this time; a vehicle controller for controlling the vehicle on the basis of the relative relationship, and changing details of the control according to whether the object recognized as the target object is the actually detected object or the extrapolated object; a stationary object determination device for determining whether the object recognized as the control target is a stationary object; and a reflection level prediction device for predicting a reflection level of the object recognized as the control target at a next detection from a reflection level at a previous detection and a reflection level at a current detection, wherein the extrapolation device determines the object, which is recognized as the control target this time, as an extrapolated object when the object is the stationary object, and the predicted reflection level is lower than the detection threshold, and the vehicle controller reduces an extent of the vehicle control for the extrapolated object as compared with that of the vehicle control for the actually detected object.

With the above described configuration, when the object that has been recognized as the control target by the control target object recognition device by last time is not recognized as the control target this time, the extrapolation device assumes that the object predicted by the relative relationship prediction device is actually detected and extrapolates the object up to the predetermined number of times. When the object is the stationary object, and the reflection level of the object at the next detection predicted from the reflection level at the previous detection and the reflection level at the current detection is lower than the detection threshold, that is, the reflection level of the object is suddenly reduced and the object is not the control target, the extrapolation device determines the object, which is recognized as the control target this time, as an extrapolated object, and handles, as extrapolated data, data of the object recognized as the control target this time to be originally actual data. Thus, the extent of the vehicle control for the extrapolated object can be reduced as compared with that of the vehicle control for the actually detected object to prevent excessive vehicle control.

According to a fourth feature of the present invention, there is provided a control target recognition system comprising: a transmitter for transmitting electromagnetic waves toward a predetermined detection area at a predetermined time interval; a receiver for receiving reflected waves that are the electromagnetic waves transmitted by the transmitter and reflected by an object; an object detection device for detecting the object on the basis of a reflected wave having a reflection level of a detection threshold or higher among the reflected waves received by the receiver; a relative relationship calculator for calculating a relative relationship between a subject vehicle and the object on the basis of a detection result of the object detection device; a relative relationship prediction device for predicting a current relative relationship on the basis of the relative relationship calculated last time by the relative relationship calculator; an identity determination device for comparing the relative relationship predicted this time by the relative relationship prediction device with the relative relationship calculated this time by the relative relationship calculator, and determining that an object detected last time is identical to an object detected this time; a control target object recognition device for recognizing, as a control target object, an object when the object is determined to be identical by the identity determination device a predetermined number of times; an extrapolation device for assuming that the object predicted by the relative relationship prediction device is actually detected and extrapolating the object up to a predetermined number of times, when an object that has been recognized as a control target by the control target object recognition device by last time is not recognized as the control target this time; a vehicle controller for controlling the vehicle on the basis of the relative relationship, and changing timing of carrying out the control according to whether the object recognized as the target object is the actually detected object or the extrapolated object; a stationary object determination device for determining whether the object recognized as the control target is a stationary object; and a reflection level prediction device for predicting a reflection level of the object recognized as the control target at a next detection from a reflection level at a previous detection and a reflection level at a current detection, wherein the extrapolation device determines the object, which is recognized as the control target this time, as an extrapolated object when the object is the stationary object, and the predicted reflection level is lower than the detection threshold, and the vehicle controller reduces a chance of the vehicle control for the extrapolated object as compared with that of the vehicle control for the actually detected object.

With the above described configuration, when the object that has been recognized as the control target by the control target object recognition device by last time is not recognized as the control target this time, the extrapolation device assumes that the object predicted by the relative relationship prediction device is actually detected and extrapolates the object up to the predetermined number of times. When the object is the stationary object, and the reflection level of the object at the next detection predicted from the reflection level at the previous detection and the reflection level at the current detection is lower than the detection threshold, that is, the reflection level of the object is suddenly reduced and the object is not the control target, the extrapolation device determines the object, which is recognized as the control target this time, as an extrapolated object, and handles, as extrapolated data, data of the object recognized as the control target this time to be originally actual data. Thus, the vehicle control for the extrapolated object can be delayed from the vehicle control for the actually detected object to prevent excessive vehicle control.

According to a fifth feature of the present invention, there is provided a vehicle object detection system comprising: a transmitter for transmitting electromagnetic waves toward a predetermined detection area at a predetermined time interval; a receiver for receiving reflected waves that are the electromagnetic waves transmitted by the transmitter and reflected by an object; an object detection device for detecting the object on the basis of a reflected wave having a reflection level of a detection threshold or higher among the reflected waves received by the receiver; a relative relationship calculator for calculating a relative relationship between a subject vehicle and the object on the basis of a detection result of the object detection device; a relative relationship prediction device for predicting a current relative relationship on the basis of the relative relationship calculated last time by the relative relationship calculator, an identity determination device for comparing the relative relationship predicted this time by the relative relationship prediction device with the relative relationship calculated this time by the relative relationship calculator, and determining that an object detected last time is identical to an object detected this time; a control target object recognition device for recognizing, as a control target object, an object when the object is determined to be identical by the identity determination device a predetermined number of times; an extrapolation device for assuming that the object predicted by the relative relationship prediction device is actually detected and extrapolating the object up to a predetermined number of times, when an object that has been recognized as a control target by the control target object recognition device by last time is not recognized as the control target this time; and a vehicle controller for controlling the vehicle on the basis of the relative relationship, and changing details of the control according to whether the object recognized as the target object is the actually detected object or the extrapolated object, wherein the system further comprises: a stationary object determination device for determining whether the object recognized as the control target is a stationary object; and a successiveness determination device for determining, when a plurality of stationary objects exist, whether the plurality of stationary objects are successive at substantially regular intervals, and the extrapolation device determines the actually detected stationary objects as extrapolated objects when it is determined that the stationary objects are successive, and the vehicle controller reduces an extent of the vehicle control for the extrapolated objects as compared with that of the vehicle control for the actually detected objects.

With the above described configuration, when the object that has been recognized as the control target by the control target object recognition device by last time is not recognized as the control target this time, the extrapolation device assumes that the object predicted by the relative relationship prediction device is actually detected and extrapolates the object up to the predetermined number of times. When the objects are the stationary objects and successive at substantially regular intervals, the actually detected stationary objects are determined as extrapolated objects, and the extent of the vehicle control for the extrapolated objects is reduced. Thus, even if stationary objects such as illumination lamps are provided at regular intervals on a ceiling of a tunnel, excessive vehicle control for the stationary objects such as the illumination lamps with which the subject vehicle is unlikely to come into contact is prevented to eliminate discomfort of the driver.

According to a sixth feature of the present invention, there is provided a vehicle object detection system comprising: a transmitter for transmitting electromagnetic waves toward a predetermined detection area at a predetermined time interval; a receiver for receiving reflected waves that are the electromagnetic waves transmitted by the transmitter and reflected by an object; an object detection device for detecting the object on the basis of a reflected wave having a reflection level of a detection threshold or higher among the reflected waves received by the receiver, a relative relationship calculator for calculating a relative relationship between a subject vehicle and the object on the basis of a detection result of the object detection device; a relative relationship prediction device for predicting a current relative relationship on the basis of the relative relationship calculated last time by the relative relationship calculator; an identity determination device for comparing the relative relationship predicted this time by the relative relationship prediction device with the relative relationship calculated this time by the relative relationship calculator, and determining that an object detected last time is identical to an object detected this time; a control target object recognition device for recognizing, as a control target object, an object when the object is determined to be identical by the identity determination device a predetermined number of times; an extrapolation device for assuming that the object predicted by the relative relationship prediction device is actually detected and extrapolating the object up to a predetermined number of times, when an object that has been recognized as a control target by the control target object recognition device by last time is not recognized as the control target this time; and a vehicle controller for controlling the vehicle on the basis of the relative relationship, and changing timing of carrying out the control according to whether the object recognized as the target object is the actually detected object or the extrapolated object, wherein the system further comprises: a stationary object determination device for determining whether the object recognized as the control target is a stationary object; and a successiveness determination device for determining, when a plurality of stationary objects exist, whether the plurality of stationary objects are successive at substantially regular intervals, and the extrapolation device determines the actually detected stationary objects as extrapolated objects when it is determined that the stationary objects are successive, and the vehicle controller reduces a chance of the vehicle control for the extrapolated object as compared with that of the vehicle control for the actually detected object.

With the above described configuration, when the object that has been recognized as the control target by the control target object recognition device by last time is not recognized as the control target this time, the extrapolation device assumes that the object predicted by the relative relationship prediction device is actually detected and extrapolates the object up to the predetermined number of times. When the objects are the stationary objects and successive at substantially regular intervals, the actually detected stationary objects are determined as extrapolated objects, and the vehicle control for the extrapolated objects is delayed. Thus, even if stationary objects such as illumination lamps are provided at regular intervals on a ceiling of a tunnel, excessive vehicle control for the stationary objects such as the illumination lamps with which the subject vehicle is unlikely to come into contact is prevented to eliminate discomfort of the driver.

According to a seventh feature of the present invention, there is provided a vehicle object detection system comprising: a transmitter for transmitting electromagnetic waves toward a predetermined detection area at a predetermined time interval; a receiver for receiving reflected waves that are the electromagnetic waves transmitted by the transmitter and reflected by an object; an object detection device for detecting the object on the basis of a reflected wave having a reflection level of a detection threshold or higher among the reflected waves received by the receiver; a relative relationship calculator for calculating a relative relationship between a subject vehicle and the object on the basis of a detection result of the object detection device; a relative relationship prediction device for predicting a current relative relationship on the basis of the relative relationship calculated last time by the relative relationship calculator; an identity determination device for comparing the relative relationship predicted this time by the relative relationship prediction device with the relative relationship calculated this time by the relative relationship calculator, and determining that an object detected last time is identical to an object detected this time; a control target object recognition device for recognizing, as a control target object, an object when the object is determined to be identical by the identity determination device a predetermined number of times; and an extrapolation device for assuming that the object predicted by the relative relationship prediction device is actually detected and extrapolating the object up to a predetermined number of times, when an object that has been recognized as a control target by the control target object recognition device by last time is not recognized as the control target this time, wherein the system further comprises: a stationary object determination device for determining whether the object recognized as the control target is a stationary object; and a successiveness determination device for determining, when a plurality of stationary objects exist, whether the plurality of stationary objects are successive at substantially regular intervals, wherein if it is determined that the stationary objects are successive, the extrapolation device reduces the number of extrapolations when the object that has been detected is out of detection and becomes an extrapolated object.

With the above described configuration, when the object that has been recognized as the control target by the control target object recognition device by last time is not recognized as the control target this time, the extrapolation device assumes that the object predicted by the relative relationship prediction device is actually detected and extrapolates the object up to the predetermined number of times. When the objects are the stationary objects and successive at substantially regular intervals, the limit of the number of extrapolations by the extrapolation device is reduced. Thus, the number of extrapolations for stationary objects such as illumination lamps provided at regular intervals on a ceiling of a tunnel is reduced, and unnecessary vehicle control for the stationary objects with which the subject vehicle is unlikely to come into contact is prevented to eliminate discomfort of the driver.

According to an eighth feature of the present invention, in addition to any one of the fifth to seventh features, the successiveness determination device includes: a reference object setting device for setting a reference object of the plurality of stationary objects determined by the stationary object determination device; a first close object determination device for determining, as a first close object, an object within a predetermined distance from the reference object in a width direction of the subject vehicle; a positional relationship calculator for calculating a distance between the reference object and the first close object and a direction of the first close object with respect to the reference object; a predicted position setting device for setting a predicted position where a second close object close to the first close object is predicted to exist on the basis of the distance and the direction calculated by the positional relationship calculator; and a second close object determination device for determining, as a second close object, an object closest to the predicted position among objects that exist in a predetermined range set on the basis of the predicted position, and the successiveness determination device determines that the reference object, the first close object and the second close object are successive when the second close object is determined.

With the above described configuration, the reference object setting device sets the reference object of the plurality of stationary objects determined by the stationary object determination device, the first close object determination device determines the first close object closest to the reference object, the positional relationship calculator calculates the distance between the reference object and the first close object and the direction of the first close object with respect to the reference object, the predicted position setting device sets the predicted position where the second close object close to the first close object is predicted to exist on the basis of the distance and the direction, and the second close object determination device determines the second close object closest to the predicted position, thereby allowing successiveness of the plurality of stationary objects to be determined with high accuracy.

According to a ninth feature of the present invention, in addition to the eighth feature, the predetermined range is set according to the distance between the reference object and the first close object.

With the above described configuration, the vehicle object detection system is provided wherein the predetermined range is set according to the distance between the reference object and the first close object.

With the above described configuration, the predetermined range set on the basis of the predicted position is set according to the distance between the reference object and the first close object. Thus, detection accuracy of the object detection device that is lower for a longer distance can be compensated.

The foregoing and other objects, features and advantages of the present invention will become more apparent from the following description of preferred embodiments with reference to the drawings.

BRIEF DESCRIPTION OF THE DRAWINGS

FIGS. 1 to 7J show a first embodiment of the present invention and a conventional example.

FIG. 1 is a block diagram of an electronic control unit of a control target recognition system.

FIGS. 3A and 3B are time charts for illustrating an operation of the embodiment.

FIG. 4 shows a main flowchart.

FIG. 5 shows a transfer sub-flowchart from the previous target.

FIG. 6 shows a previous target processing sub-flowchart.

FIGS. 7A to 7J illustrate an operation of the conventional example.

FIGS. 8 to 25 show a second embodiment of the present invention and a conventional example.

FIG. 8 is a block diagram of an electronic control unit of a vehicle object detection system.

FIG. 9 is a block diagram of successiveness determination device.

FIGS. 10A to 19B illustrate an operation of object detection in the conventional example and the embodiment.

FIGS. 20A and 20B are time charts for illustrating whether activation of vehicle controller occurs in the conventional example and the embodiment.

FIGS. 21A to 21P illustrate an operation of stopping object successiveness determination.

FIG. 22 is a flowchart of a main routine.

FIG. 23 is a flowchart of a transfer sub-routine from the previous target.

FIG. 24 is a flowchart of a previous target processing sub-routine.

FIG. 25 is a flowchart of a stopping object successiveness determination sub-routine.

DESCRIPTION OF THE PREFERRED EMBODIMENTS

Now, a first embodiment of the present invention will be described with reference to FIGS. 1 to 7J.

Figure 1:
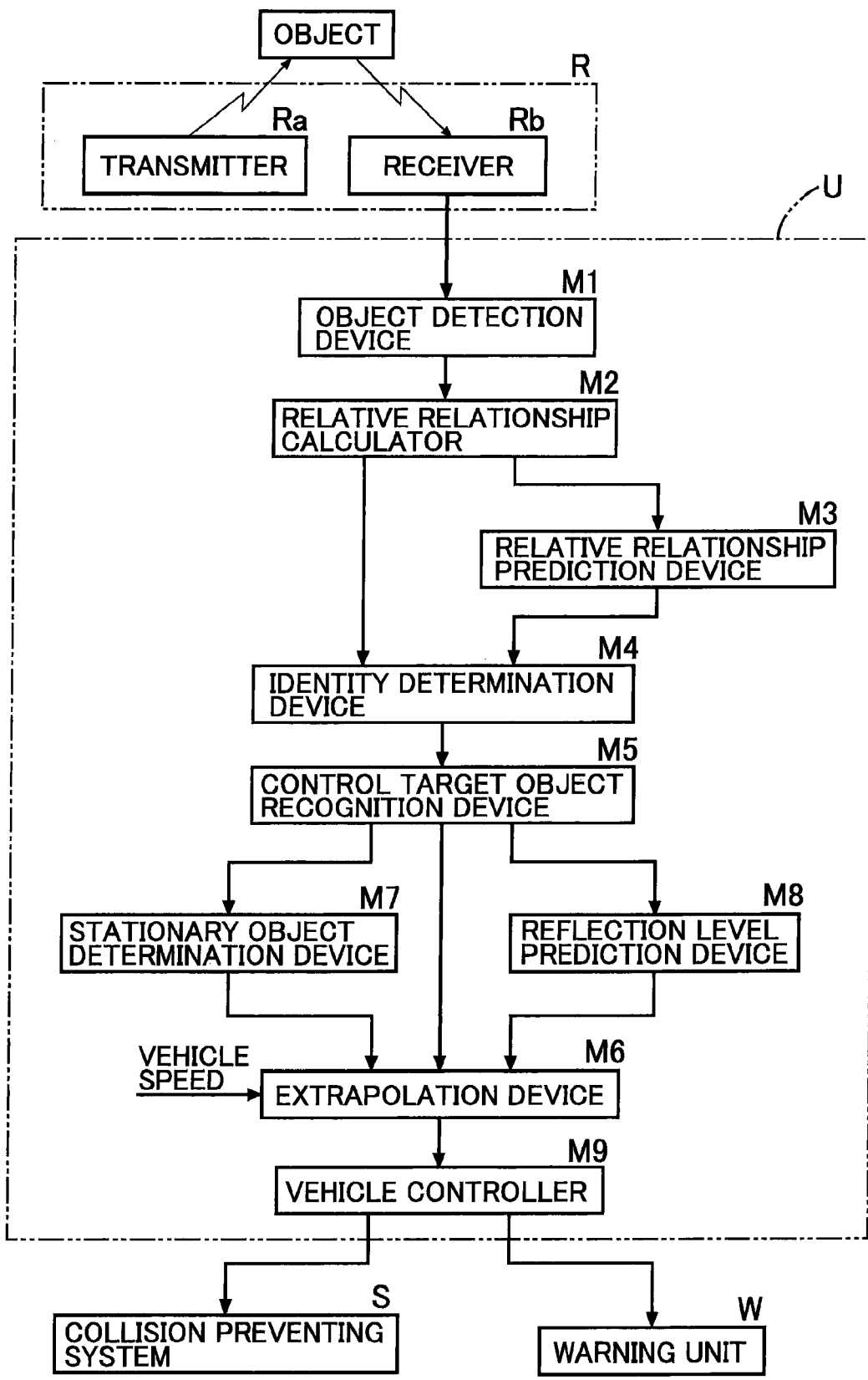

As shown in FIG. 1, a control target recognition system of the embodiment activates a collision preventing system S that brakes a subject vehicle by automatic braking and a warning unit W that urges a driver to perform spontaneous braking when the subject vehicle runs following a preceding vehicle detected by a radar device R including a transmitter Ra for transmitting electromagnetic waves and a receiver Rb for receiving reflected waves of the electromagnetic waves reflected from an object, and a distance between the subject vehicle and the preceding vehicle is a predetermined value or less to increase a possibility of a collision or a collision with a stopping object on a road cannot be avoided. An electronic control unit U connected to the radar device R, the collision preventing system S, and the warning unit W includes an object detection device M1, a relative relationship calculator M2, a relative relationship prediction device M3, an identity determination device M4, a control target object recognition device M5, an extrapolation device M6, a stationary object determination device M7, a reflection level prediction device M8, and a vehicle controller M9.

The object detection device M1 compares a reflection level of the reflected wave received by the receiver Rb in the radar device R with a predetermined detection threshold, and detects only an object having a reflection level of a detection threshold or higher. The relative relationship calculator M2 calculates a relative relationship such as a relative position and a relative speed of the subject vehicle and the object on the basis of a detection result of the object detection device M1. The relative relationship prediction device M3 predicts the next relative relationship from the current relative relationship calculated by the relative relationship calculator M2. The identity determination device M4 compares the actual relative relationship calculated this time with the estimated relative relationship predicted this time to determine identity between the object detected last time and the object detected this time. The control target object recognition device M5 determines only an object determined to be an identical object successively a predetermined number of times by the identity determination device M4, as an object to be finally a control target (a target of automatic braking or warning), in order to avoid erroneously recognizing a different object as an identical object.

The extrapolation device M6 assumes that a control target that is lost sight of is successively recognized, and estimates extrapolated data from past data of the control target (the relative position and the relative speed) to extrapolate the data over a predetermined number of times (five in the embodiment), when an object that has been recognized as the control target by the control target object recognition device M5 by last time is not recognized as the control target this time, for example, when the object detection device M1 loses sight of the control target. Specifically, the data that is not recognized is assumed to be recognized, and outputted as extrapolated data. Thus, even if the control target cannot be temporarily recognized due to noises or the like, the control can be continued without interruption. Of course, when the control target that is not recognized is again recognized, and identity between the control target recognized again and the extrapolated data is confirmed, the extrapolated data is again transferred to the actual data.

The general maximum number of extrapolation processings by the extrapolation device M6 is five, and if the extrapolated data is not transferred to the actual data after five extrapolation processings, for example, if the control target changes its direction and disappears from forward of the subject vehicle, the extrapolated data disappears after five extrapolation processings. The general maximum number of extrapolation processings is five, but if first and second conditions described below are satisfied, the maximum number of extrapolation processings is substantially reduced to two (three including temporary extrapolated data described later).

The first condition is that the control target is a stationary object. The stationary object determination device M7 can determine that a control target is a stationary object when the control target approaches the subject vehicle at a speed close to a speed of the subject vehicle. The second condition relates to the reflection level of the control target. The reflection level prediction device M8 predicts the next reflection level of the control target from the previous reflection level and the current reflection level. The extrapolation device M6 reduces the maximum number of extrapolations from five to two when the control target is the stationary object, and the predicted next reflection level is lower than the detection threshold. When the predicted next reflection level is lower than the detection threshold, the current data of the control target is handled as extrapolated data (temporary extrapolated data) even if the current reflection level of the control target is the threshold or higher. Thus if the temporary extrapolated data is regarded as the extrapolated data, the maximum number of extrapolations is reduced from five to three (one is for the temporary extrapolated data).

The vehicle controller M9 controls activation of the collision preventing system S or the warning unit W so as to prevent the subject vehicle from colliding with the control target when the actual data or the extrapolated data of the control target enters a system activation area forward of the subject vehicle.

Specifically, in a conventional example, when a stopping object is lost sight of, extrapolated data is inserted up to five times, while in the embodiment, when a stopping object such as a low gate through which the subject vehicle can pass is lost sight of, the number of insertions of the extrapolated data is limited to a maximum of three (one is for the temporary extrapolated data) to prevent unnecessary automatic braking or warning and eliminate discomfort of a driver.

Figure 2A:
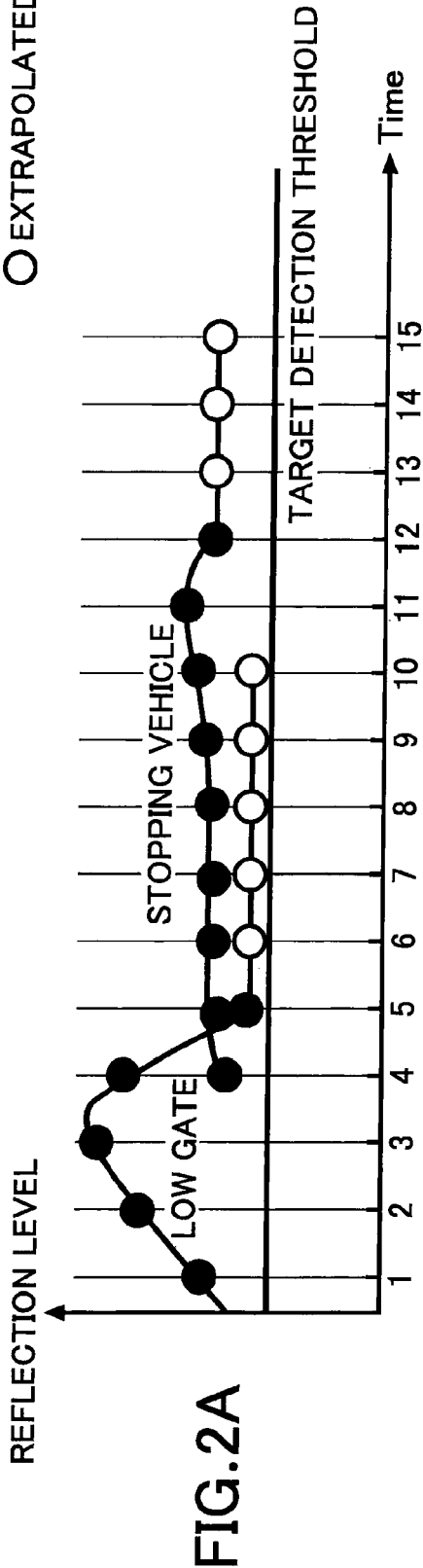
FIGS. 2A and 2B are time charts for illustrating an operation of the conventional example.
Figure 2B:
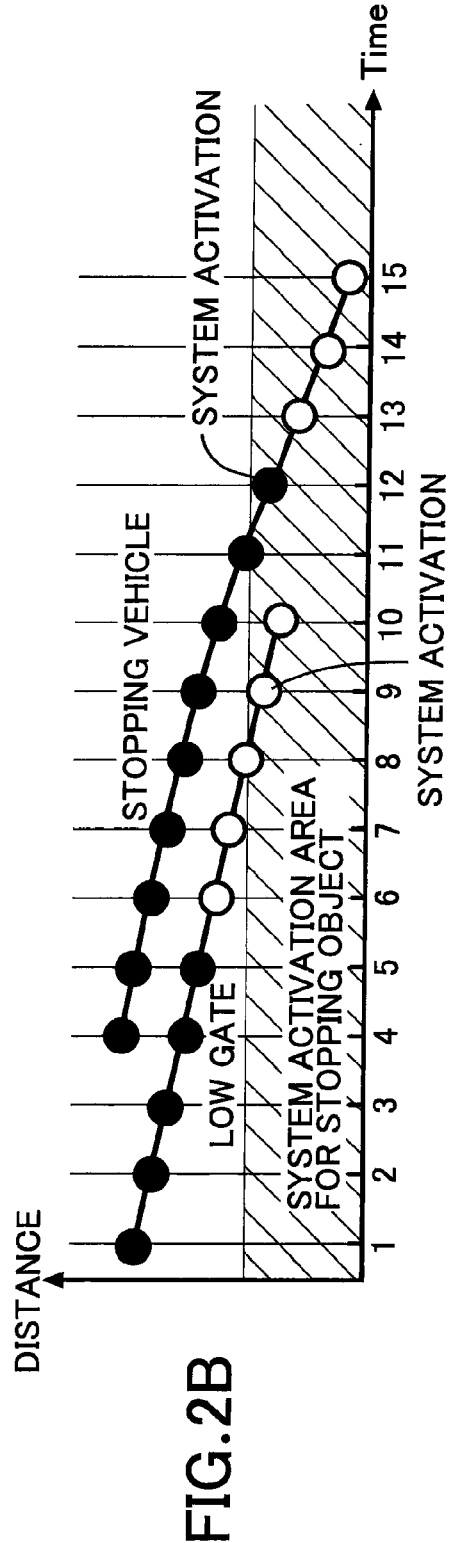

FIGS. 2A and 2B are time charts showing a conventional example in which the number of extrapolations is a maximum of five, and correspond to the case of detection of a low gate and a stopping vehicle described in FIGS. 7A to 7J. Herein ● denotes actual data having a reflection level of a detection threshold or higher, and ○ denotes extrapolated data having a reflection level lower than the detection threshold. Times correspond to Times in FIGS. 7A to 7J.

At Times 1 to 5, the reflection level of the gate is the detection threshold or higher and thus the data is the actual data, while at Time 6 and thereafter, the reflection level of the gate is lower than the detection threshold and thus the data is the extrapolated data, and the extrapolation processing is successively performed up to five times before Time 11. The reflection level of the extrapolated data is set to that immediately before the extrapolation. If the subject vehicle gradually approaches the position of the gate with the lapse of time, and the extrapolated data of the gate enters an activation area of the system at Time 8, unnecessary automatic braking or warning for preventing a collision with the gate may be performed.

The stopping vehicle forward of the subject vehicle is successively detected as the actual data at Times 4 to 12, laterally beyond the detection area to be the extrapolated data at Time 13 and thereafter, and the extrapolated data is successively inserted up to five times (only three times are shown). At Time 11, the actual data of the stopping vehicle enters the system activation area, and at that time, necessary automatic braking or warning for the stopping vehicle is started.

FIGS. 3A and 3B are time charts showing the embodiment in which the number of extrapolations is a maximum of three.

First, data at Time 6 (see □) is predicted from actual data at Time 4 and actual data at Time 5. The prediction is performed on the basis of the rate of change from the actual data at Time 4 to the actual data at Time 5. When the data at Time 6 thus predicted (see □) is lower than the detection threshold for the stopping object, the actual data at Time 5 is forced to be temporary extrapolated data, and the maximum number of insertions of succeeding extrapolated data is limited to two. Specifically, the maximum number of extrapolated data is three including the temporary extrapolated data at Time 5. The data at Time 5 is referred to as the temporary extrapolated data because the data is the extrapolated data though having a reflection level of the detection threshold or higher.

Thus, the final extrapolated data is the one at Time 7, and the extrapolated data at Time 7 is beyond the activation area of the collision preventing system S for the stopping object, and thus unnecessary activation of the collision preventing system S is avoided to eliminate discomfort of the driver. Even if the gate enters the activation area of the collision preventing system S at Time 8, the extrapolated data does not exist at the time, and thus there is no possibility of unnecessary activation of the collision preventing system S to provide discomfort to the driver.

On the other hand, even if data at Time 13 (see □) is predicted from actual data at Times 11 and 12 of the stopping vehicle, the predicted data is the detection threshold or higher, and thus a processing for changing the actual data at Time 12 to temporary extrapolated data and a processing for reducing the number of extrapolations are not performed. When the data becomes lower than the detection threshold at Time 13, insertion of the extrapolated data is performed up to five times at Time 13 and thereafter. Then, as in the conventional example, the actual data of the stopping vehicle enters the system activation area at Time 11, and thus necessary automatic braking or warning for the stopping vehicle is started at the time.

Whether the maximum number of extrapolations is five as general or three as reduced is determined by whether a reflection level of the next data predicted from the previous data and the current data is the detection threshold or higher or lower than the detection threshold. When the subject vehicle approaches the object such as the gate, the electromagnetic wave from the radar device R passes through the object, the reflection level is suddenly reduced, and the reflection level of the next data predicted from the previous data and the current data is likely to be lower than the detection threshold. On the other hand, even if the subject vehicle approaches the object such as the stopping vehicle, the electromagnetic wave from the radar device R does not pass through the object, the reflection level is not suddenly reduced, and the reflection level of the next data predicted from the previous data and the current data is likely to be the detection threshold or higher.

The next reflection level of the gate is predicted from the reflection level of the gate recognized as the control target last time and the reflection level of the gate recognized as the control target this time, and when the reflection level is lower than the detection threshold, that is, when the reflection level of the gate is suddenly reduced and the gate is not the control target, the actual data of the gate recognized as the control target this time is forced to be the extrapolated data. Thus, as described later, vehicle control is not performed until the extrapolated data enters a narrow system activation area for the extrapolated data, and the extent of the vehicle control is reduced, thereby more reliably preventing unnecessary vehicle control.

Next, the above described operation will be described in more detail with reference to flowcharts in FIGS. 4 to 6.

In Step S1 in a main flow in FIG. 4, vehicle data such as a vehicle speed and a yaw rate is obtained, in Step S2, a reflection level, a distance, a lateral position, and a relative speed of a target detected by the radar device R are calculated and stored in the current target memory. Then in Step S3, a transfer sub-flow from the previous target described below is performed, and further in Step S4, a previous target processing sub-flow described later is performed.

Then in Step S5, a target of an output flag=1 (a control target by the collision preventing system S) stored in the current target memory is outputted to the electronic control unit U. At this time, an extrapolation counter value is also outputted. Then in Step S6, data in the current target memory is moved to the previous target memory, and in Step S7, a collision is predicted from vehicle information and radar detection target data. When a target with which the subject vehicle may collide exists in Step S8, a target with a count value of the extrapolation counter of 1 or more exists in Step S9, and the target is within "the system activation area for the extrapolated data" in Step S10, half assist control is performed in Step S11, and when the target with the count value of the extrapolation counter of 1 or more does not exist, full assist control is performed in Step S12.

Thus, in the processing of the electronic control unit U, the extrapolated data is also the target of the vehicle control, but the half assist control is performed for the extrapolated data to allow vehicle control according to extrapolated data with lower accuracy than actual data. The half assist control means that the extent of the vehicle control is reduced as compared with that of the full assist control. For example, in automatic braking, deceleration of a braking force is set to be lower than in the full assist, or when both the automatic braking and the warning are used in the full assist, the warning only is performed without the automatic braking.

"The system activation area for the extrapolated data" is defined as a section closer to the subject vehicle in a system activation area for the stationary object in FIGS. 7A to 7J, which is divided into a section closer to the subject vehicle and a section apart from the subject vehicle. For the actual data, the full assist control is performed if the actual data exists within the system activation area, while for the extrapolated data, the half assist control is performed only when the extrapolated data exists in the section closer to the subject vehicle in the system activation area (that is, "the system activation area for the extrapolated data"). This prevents vehicle control from being performed until the extrapolated data with lower reliability than the actual data approaches the subject vehicle, thereby eliminating discomfort of the driver by unnecessary vehicle control.

FIG. 5 shows details of Step S3 (the transfer sub-flow from the previous target) in the flowchart in FIG. 4.

First in Step S21, the current target is invoked from the current target memory, and in Step S22, transfer from the previous target is confirmed. The transfer is performed in such a manner that a relative position of the current target is estimated with reference to a relative position of the previous target relative to the subject vehicle position and in view of a relative speed of the previous target, the current target is estimated to be identical to the previous target when the current target exists near the estimated position, and it is determined that the targets are identical for the transfer when this processing is successively performed a predetermined number of times.

Then, when the current target is transferred from and identical to the previous target in Step S23, it is determined in Step S24 whether the target is a stopping object or a moving object. Specifically, if a subject vehicle speed plus a relative speed is within a range of −10 km/h to 10 km/h, that is, if the target approaches the subject vehicle at a speed of the subject vehicle speed ±10 km/h, it is determined that the target is the stopping object, and the process moves to Step S25. In Step S25, a reflection level of the next target is predicted from the reflection level of the previous target and the reflection level of the current target. Then, when the predicted next reflection level is the detection threshold or higher in Step S26, the extrapolation counter is set to 0 in Step S27, and an output flag is set to 1 in Step S29. On the other hand, when the predicted next reflection level is lower than the detection threshold in Step S26, the extrapolation counter is not set to 0 in Step S28 but set to 3 larger than 0 in Step S28, and the output flag is set to 1 in Step S29.

When it is determined in Step S24 to be "No" and the target is the moving object, Steps S25 and S26 are skipped, and the extrapolation counter is set to 0 in Step S27. When the current target is not transferred from the previous target in Step S23, that is, the current target is a newly detected target, the extrapolation counter is set to 0 in Step S30, and the output flag is set to 0 in Step S31.

Then, Steps S21 to S31 are repeated until all the current targets are invoked in Step S32.

The current target with the output flag set to 1 is outputted to the electronic control unit U in Step S5 in the flowchart in FIG. 4 to be a control target of the collision preventing system S. When the current target is not transferred from the previous target and is less reliable (when it is determined to be "No" in Step S23), the output flag is cleared to 0, and thus vehicle control on the basis of the current target is not performed.

Figure 6:
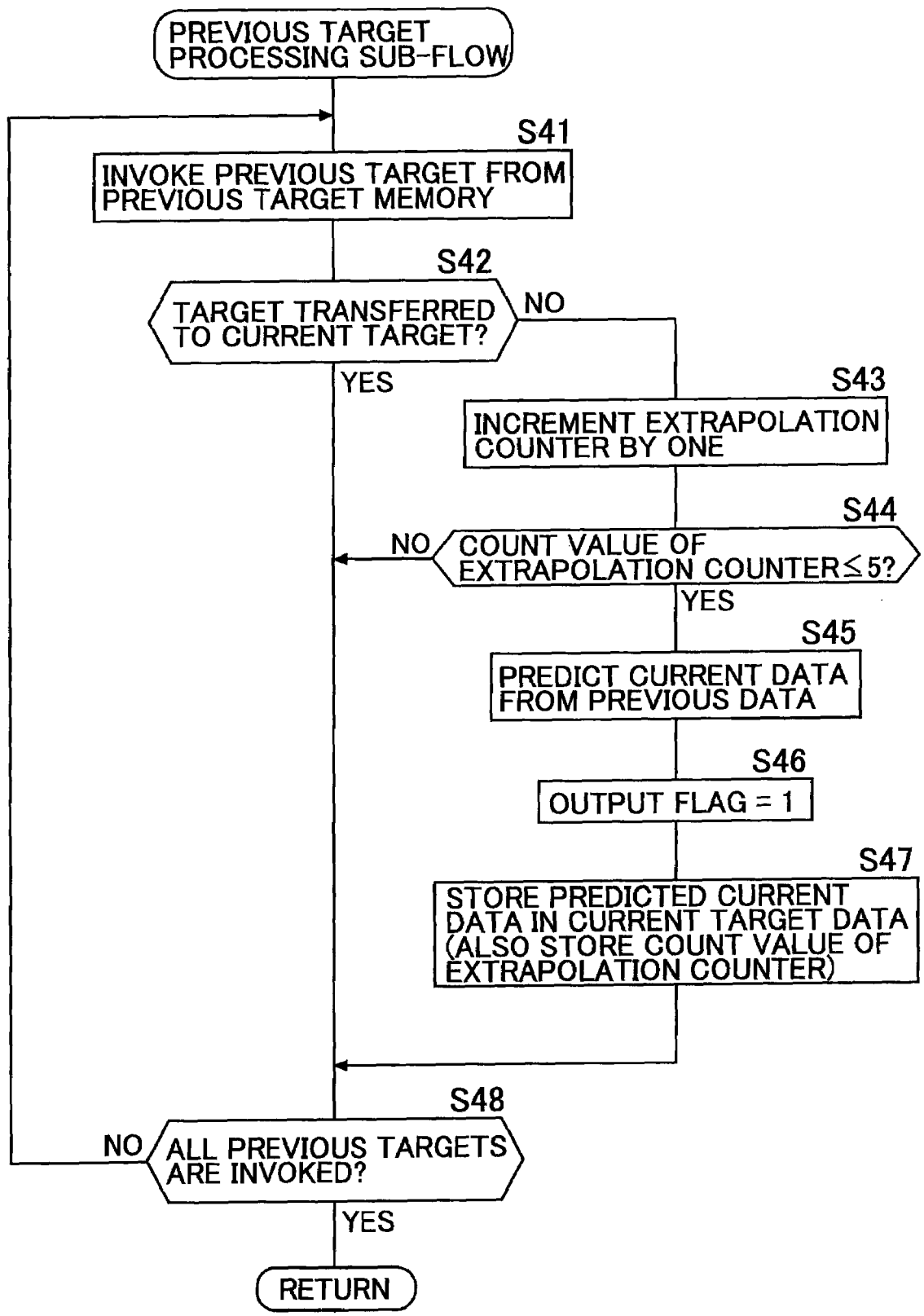
Figure 7A:
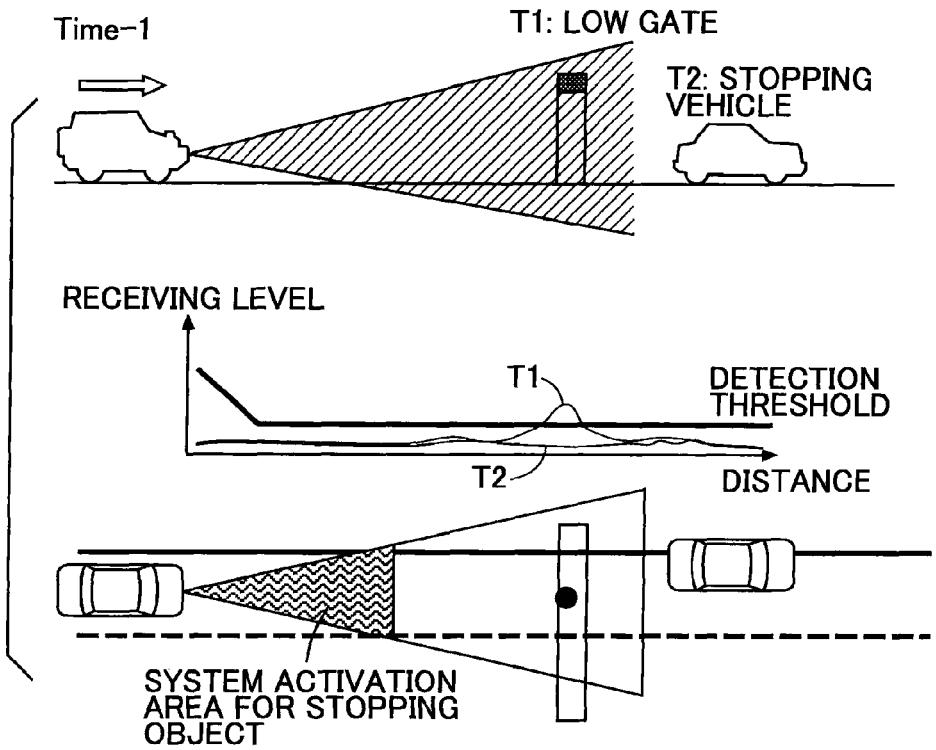
Figure 7B:
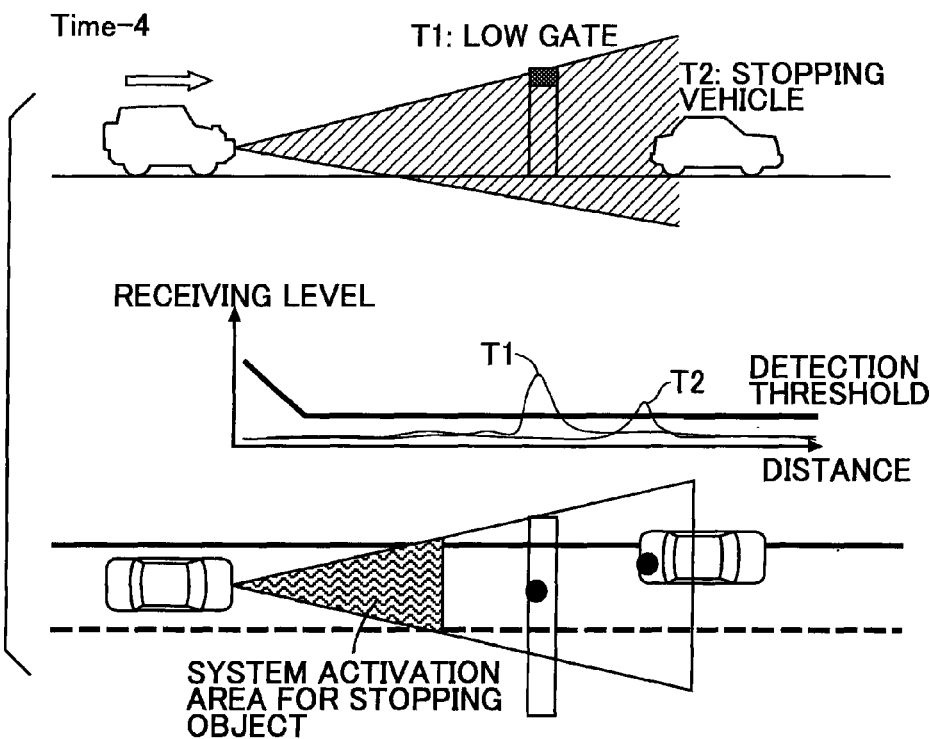
Figure 7C:
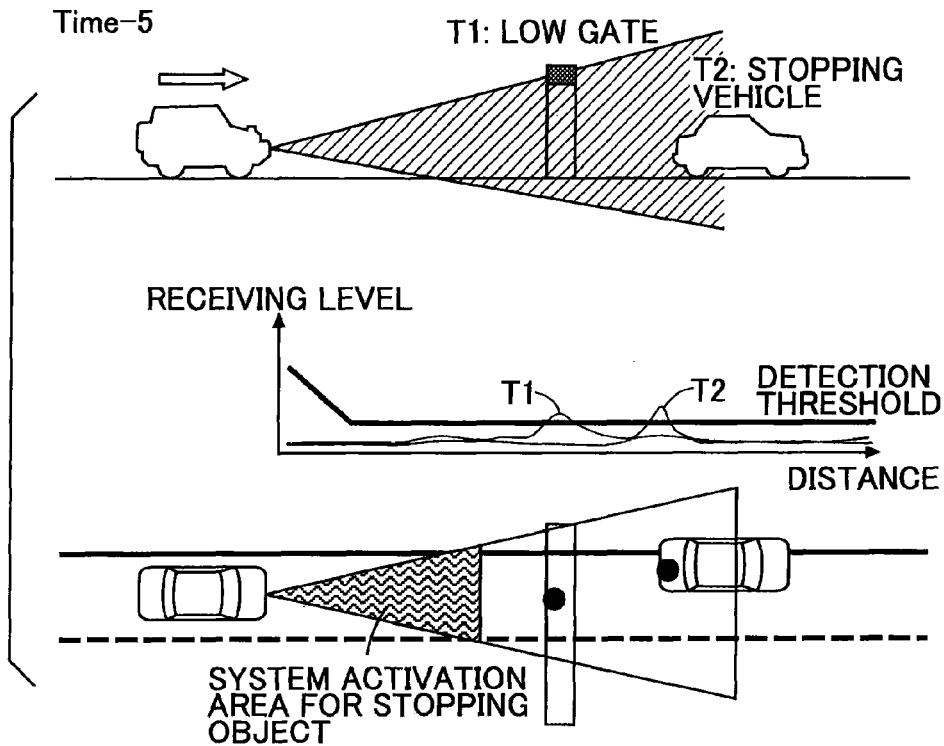
Figure 7D:
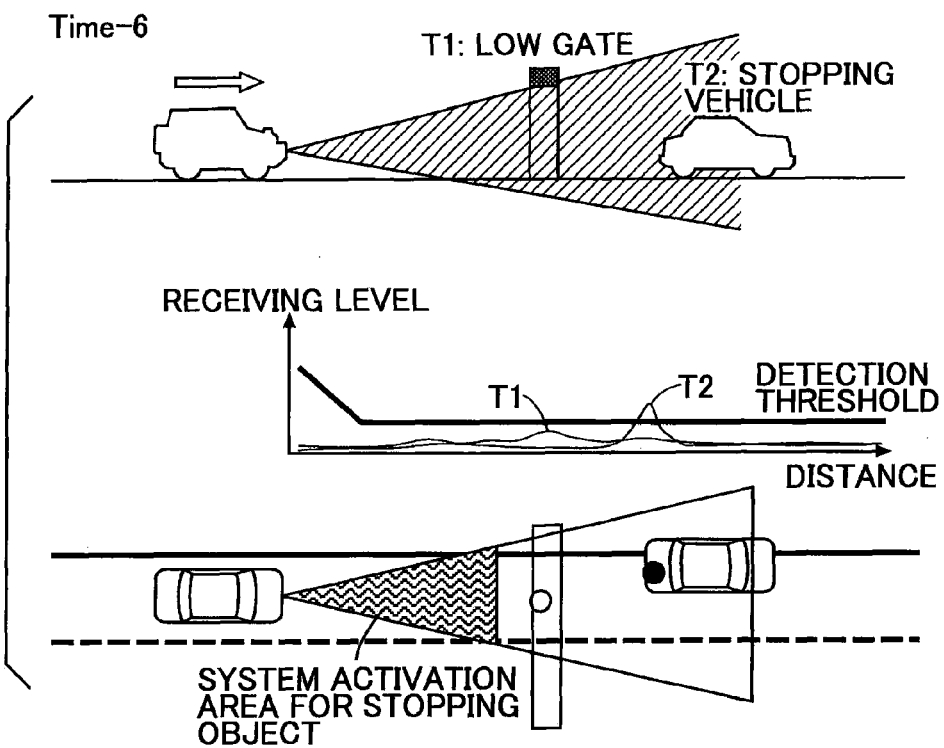
Figure 7E:
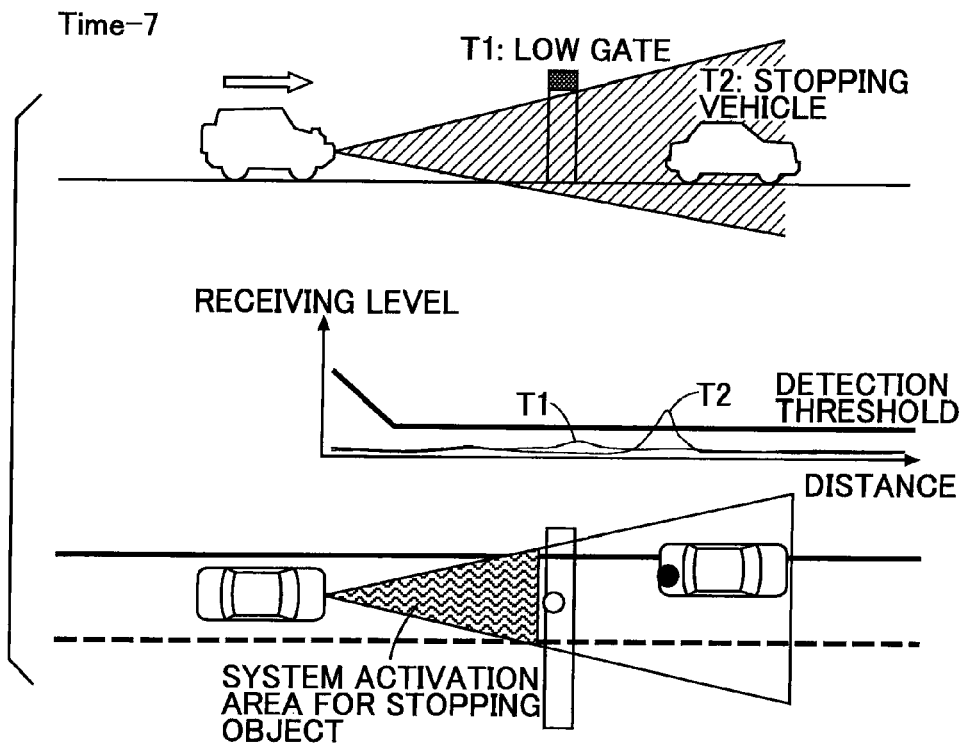
Figure 7F:
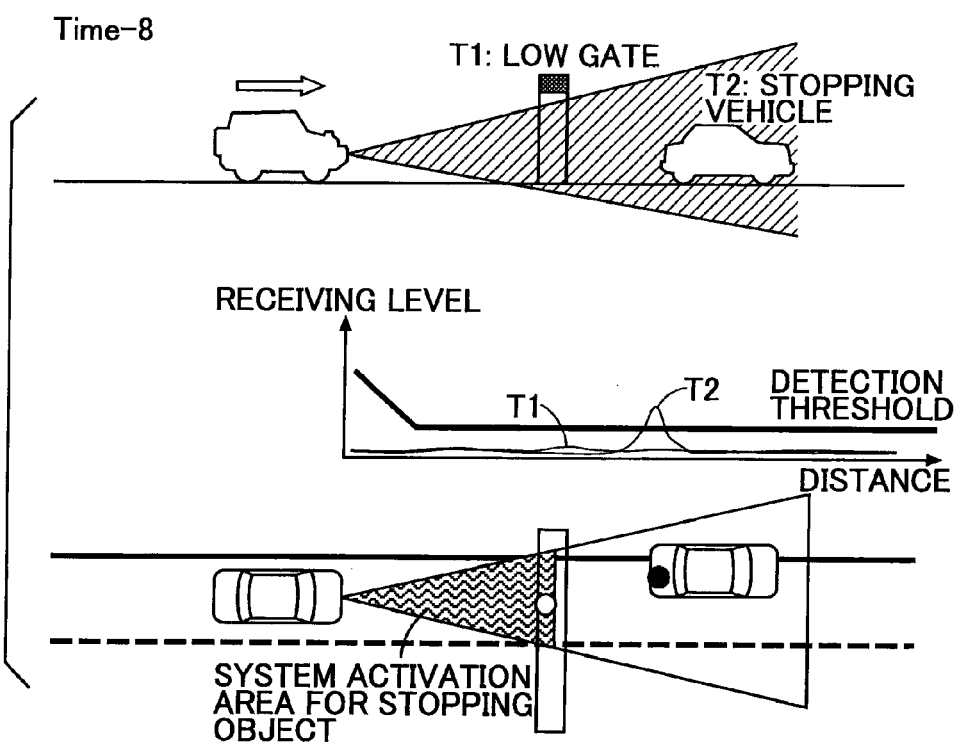
Figure 7G:
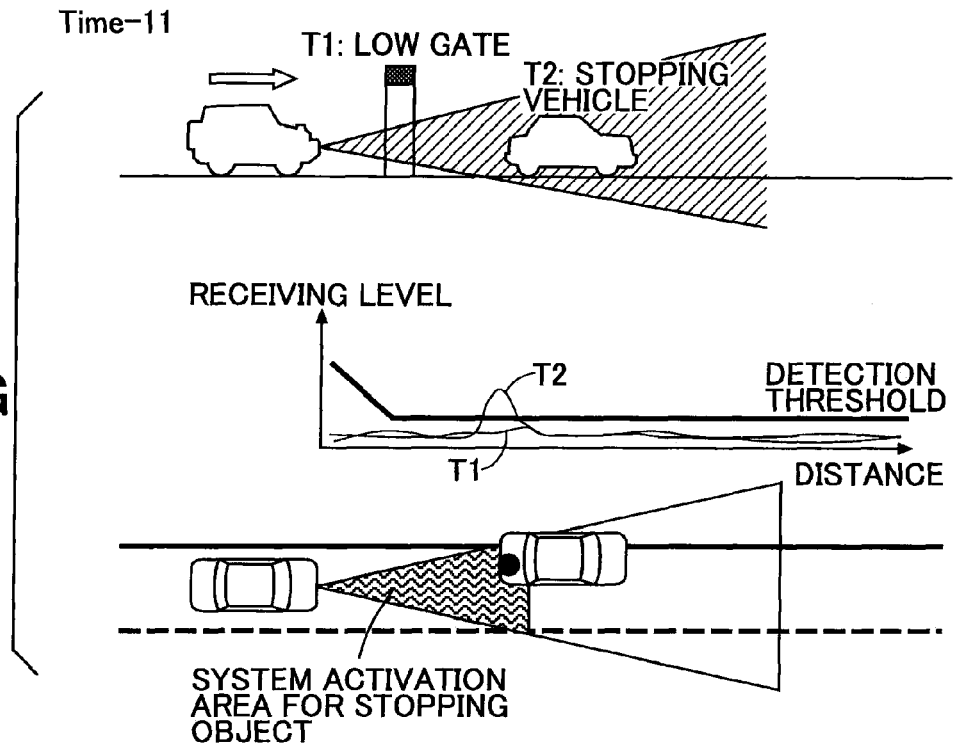
Figure 7H:
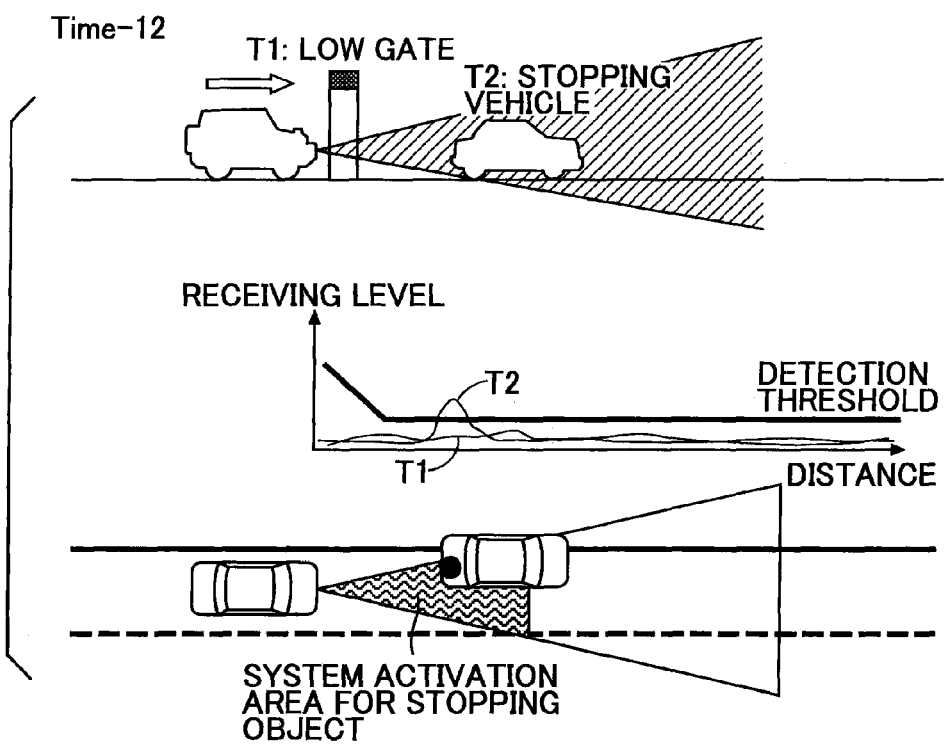
Figure 7I:
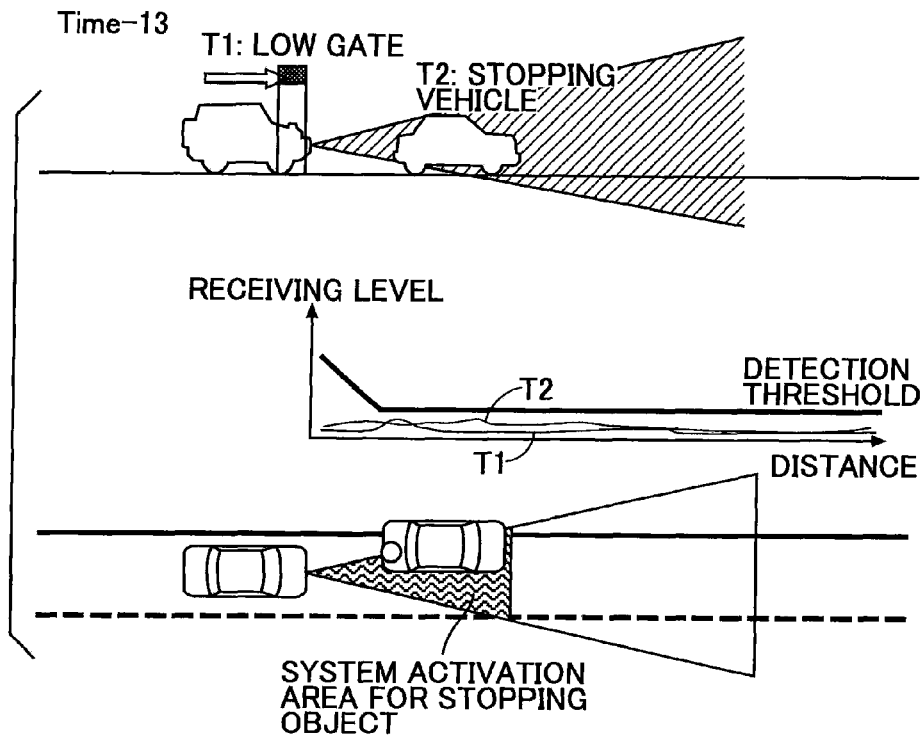
Figure 7J:
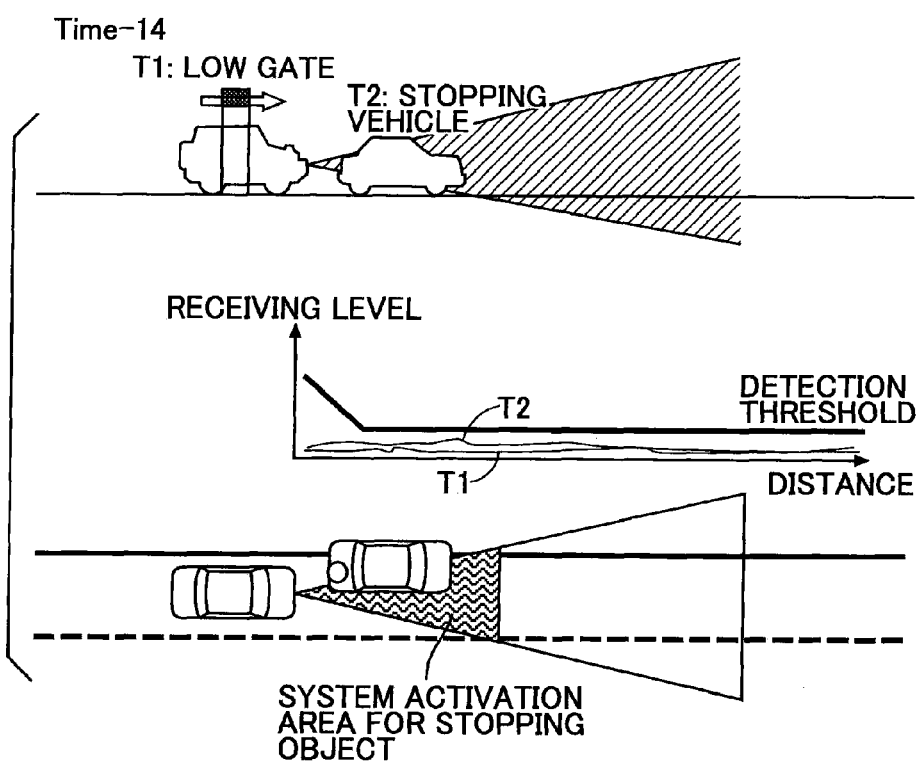

FIG. 6 shows details of Step S4 (the previous target processing sub-flow) in the flowchart in FIG. 4.

First in Step S41, the previous target is invoked from the previous target memory, and in Step S42, when the invoked previous target is not the target transferred to the current target, that is, the extrapolated target, the extrapolation counter is incremented by one in Step S43. When the count value of the extrapolation counter is 5 or less in Step S44, in Step S45, the current data is predicted from the previous data, that is, the current position is predicted from the previous position of the target, and in Step S46, the output flag is set to 1 so that the target becomes the control target of the collision preventing system S. Then in Step S47, the predicted current data is stored in the current target data, and the count value of the extrapolation counter is also stored.

When the invoked previous target is the target transferred to the current target in Step S42, the count value of the extrapolation counter exceeds 5 in Step S44, and Step S47 is passed through, Steps S41 to S47 are repeated until all the previous targets are invoked in Step S48.

When the estimated reflection level is the detection threshold or higher in Step S26, the extrapolation counter is set to 0 in Step S27, thus the extrapolation counter does not exceed 5 even after the extrapolation processing is performed five times, and the number of extrapolation processings is a maximum of five. On the other hand, when the estimated reflection level is lower than the detection threshold in Step S26, the extrapolation counter is set to 3 in Step S28, thus the extrapolation counter exceeds 5 after the extrapolation processing is performed three times, and thus the number of extrapolation processings is limited to a maximum of two. If a temporary extrapolation processing is added, the number is limited to a maximum of three.

Thus, for the stopping object such as the gate through which the subject vehicle can pass, the number of extrapolation processings is reduced from five as general to two (three if the temporary extrapolation processing is added), thereby preventing the collision preventing system S from overreacting to an obstacle with which the subject vehicle is unlikely to collide to provide discomfort to the driver.

Next, a second embodiment of the present invention will be described with reference to FIG. 8 to 25.

As shown in FIG. 8, a vehicle object detection system of the embodiment activates a collision preventing system S that brakes an subject vehicle by automatic braking and a warning unit W that urges a driver to perform spontaneous braking when the subject vehicle runs following a preceding vehicle detected by a radar device R including a transmitter Ra for transmitting an electromagnetic wave and a receiver Rb for receiving a reflected wave of the electromagnetic wave reflected from an object, and a distance between the subject vehicle and the preceding vehicle is a predetermined value or less to increase a possibility of a collision or a collision with a stopping object on a road cannot be avoided. An electronic control unit U connected to the radar device R, the collision preventing system S, and the warning unit W includes an object detection device M1, a relative relationship calculator M2, a relative relationship prediction device M3, an identity determination device M4, a control target object recognition device M5, an extrapolation device M6, a stationary object determination device M7, a successiveness determination device M8', and a vehicle controller M9.

Figure 9:
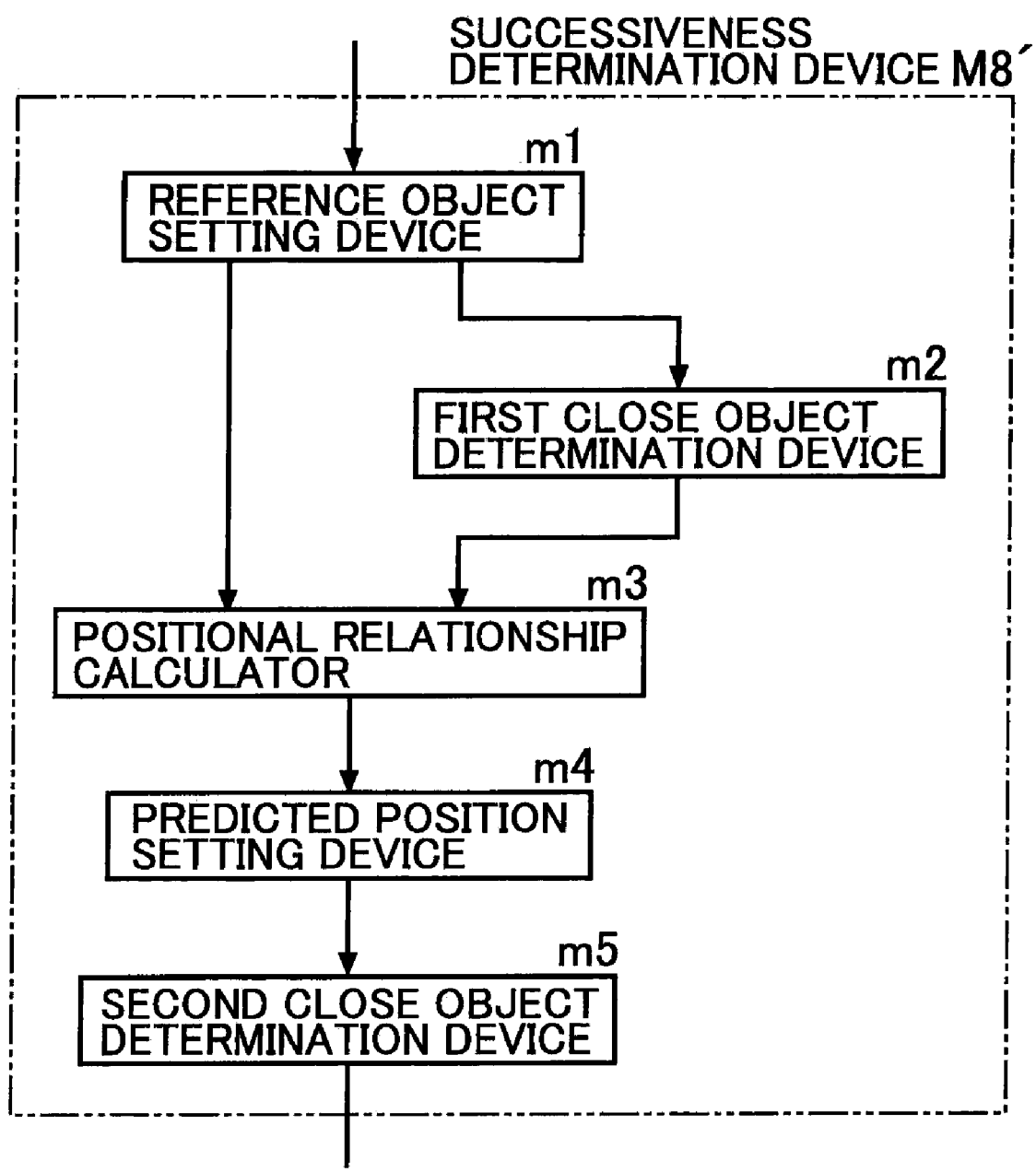
Figure 10A:
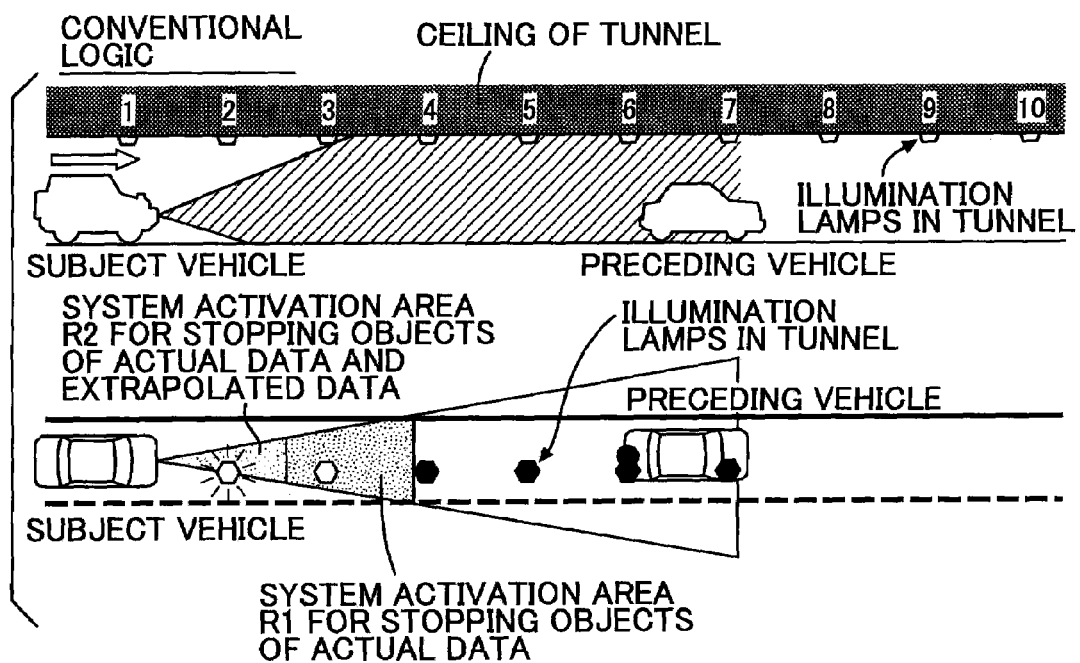
Figure 10B:
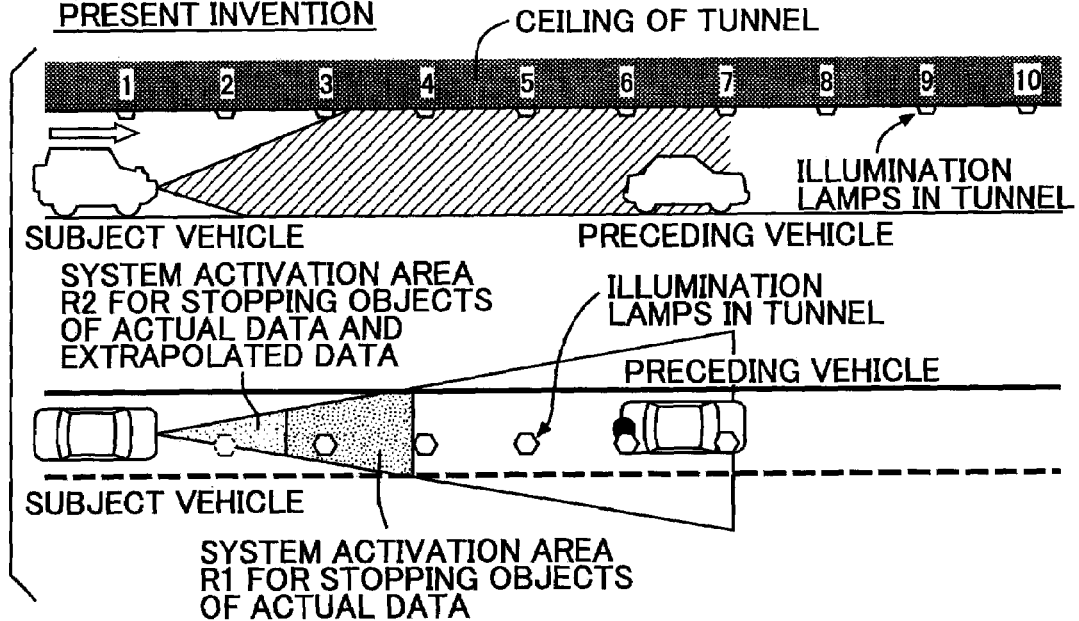
Figure 11A:
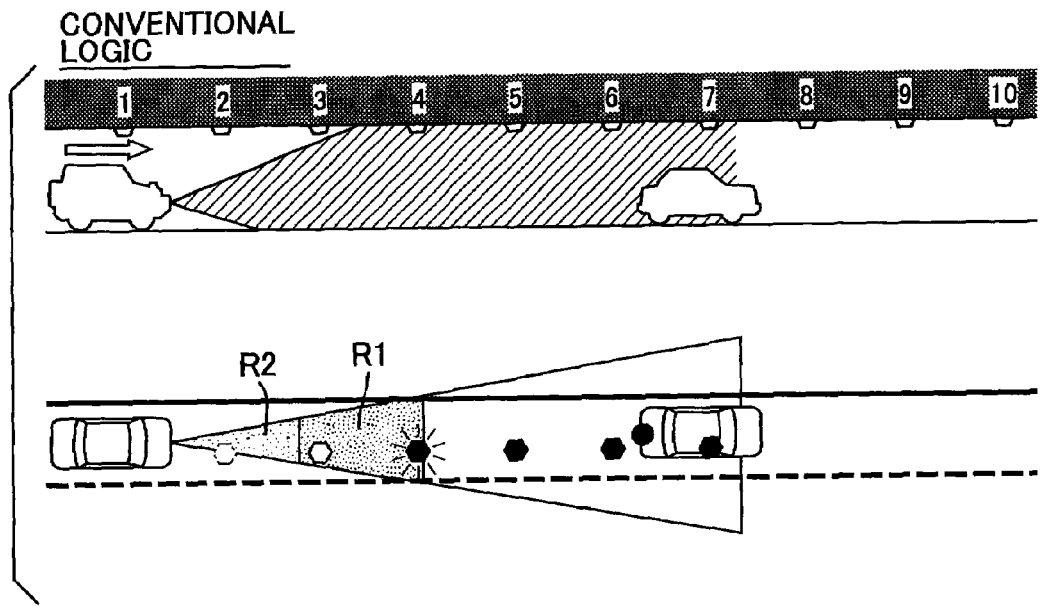
Figure 11B:
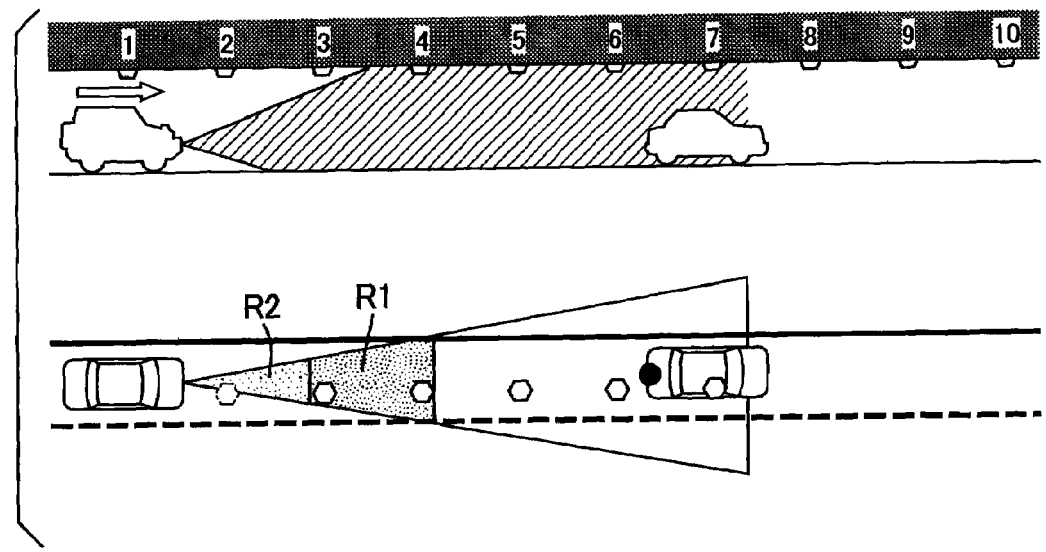
Figure 12A:
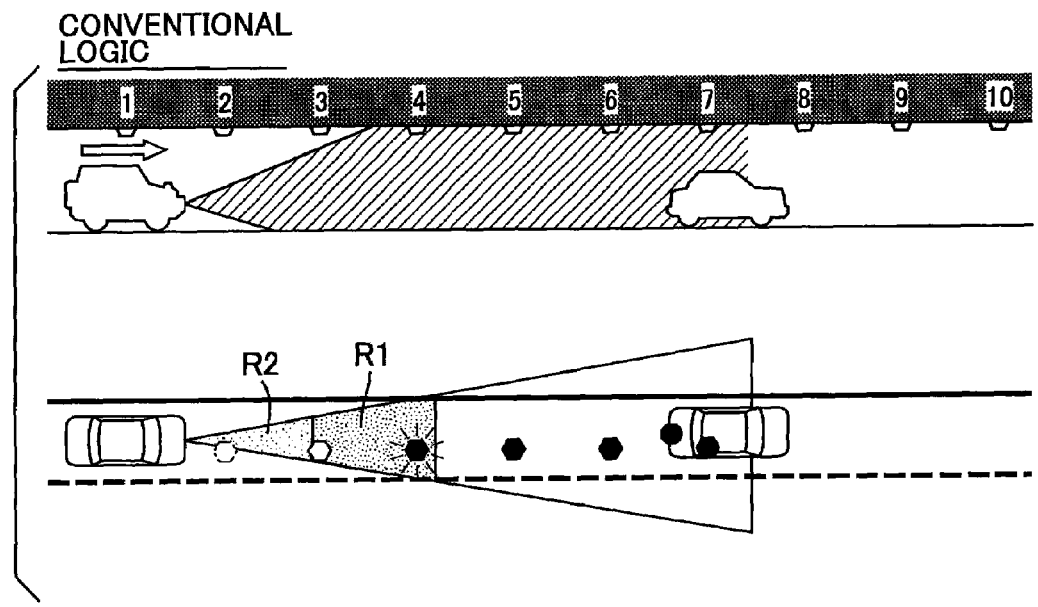
Figure 12B:
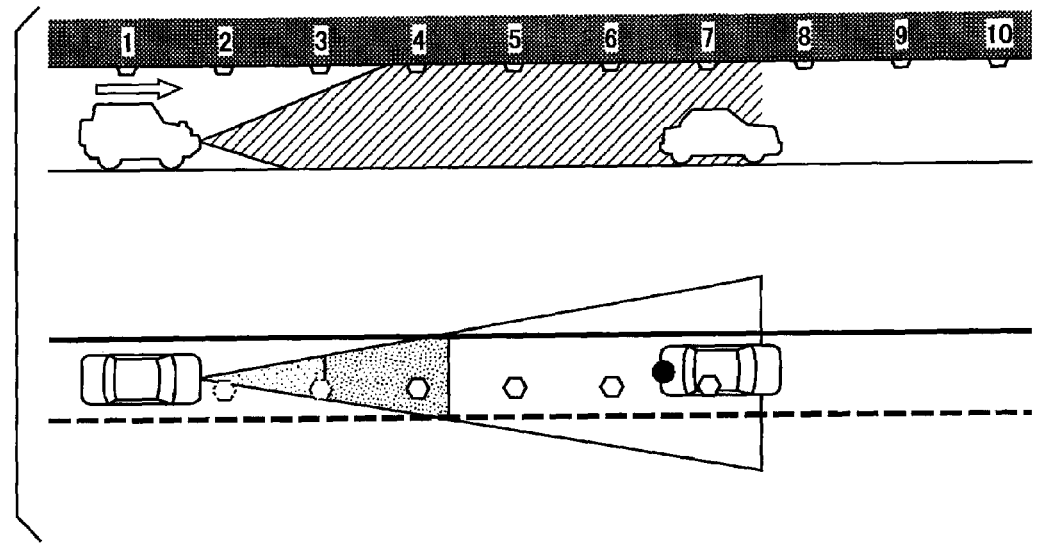
Figure 14A:
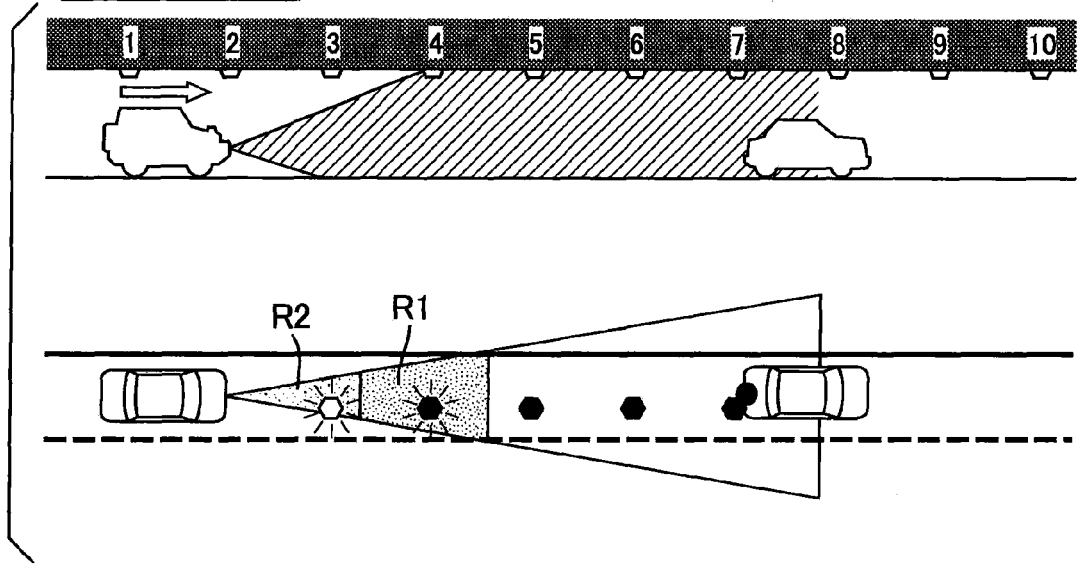
Figure 14B:
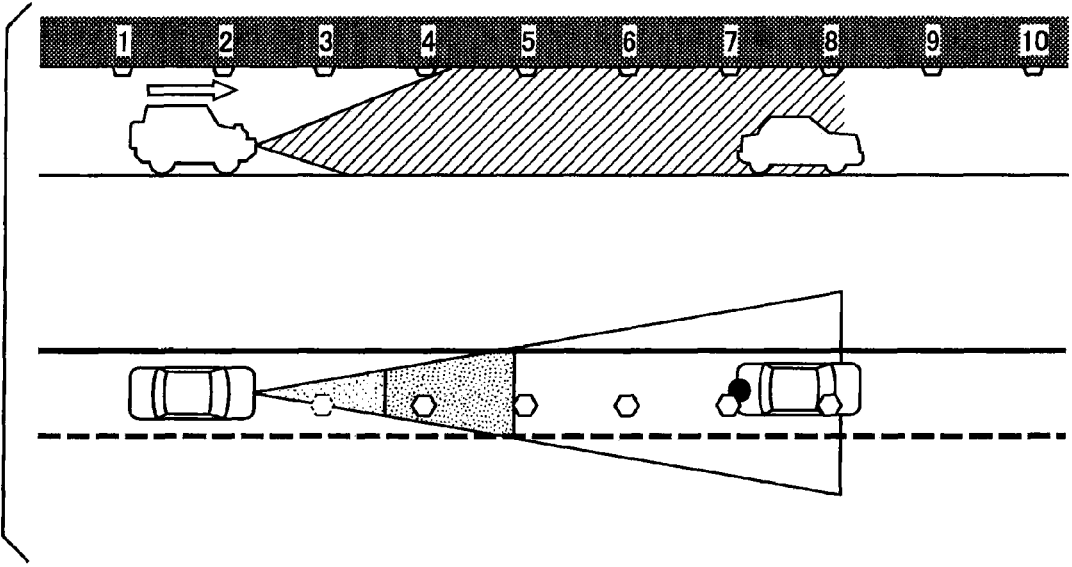
Figure 16A:
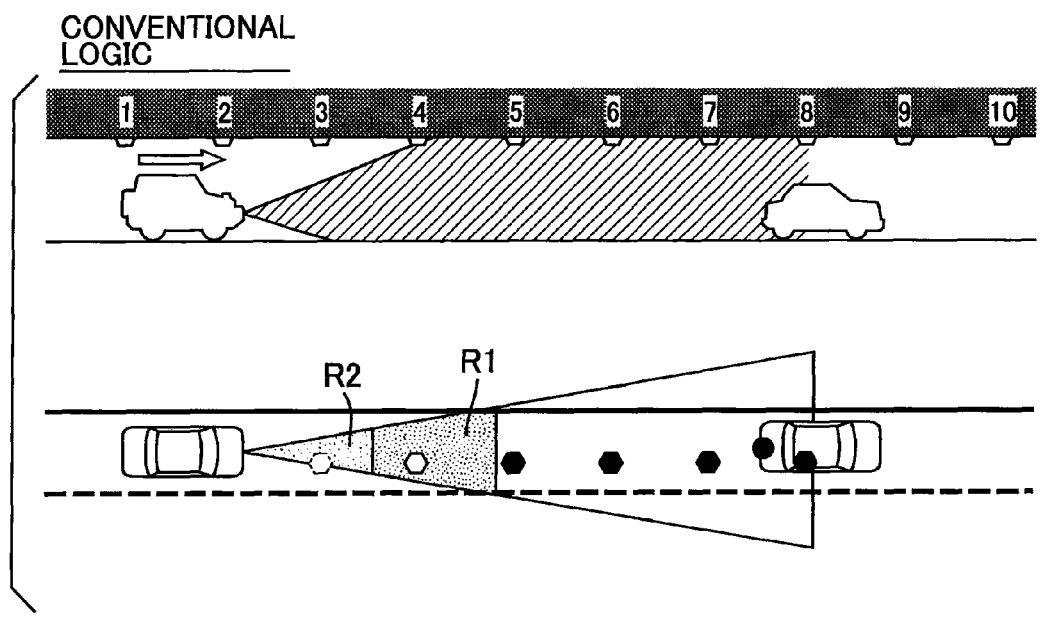
Figure 16B:
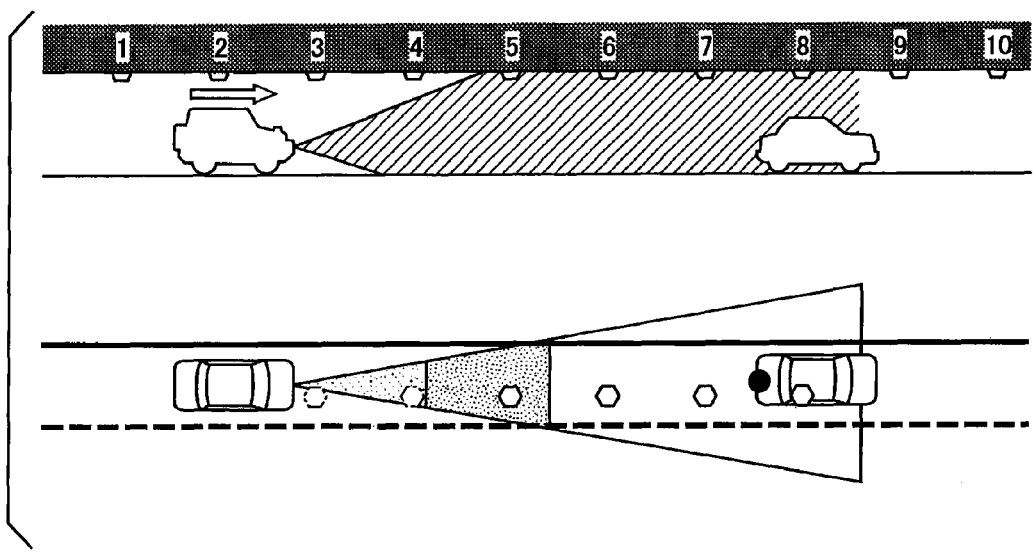
Figure 17A:
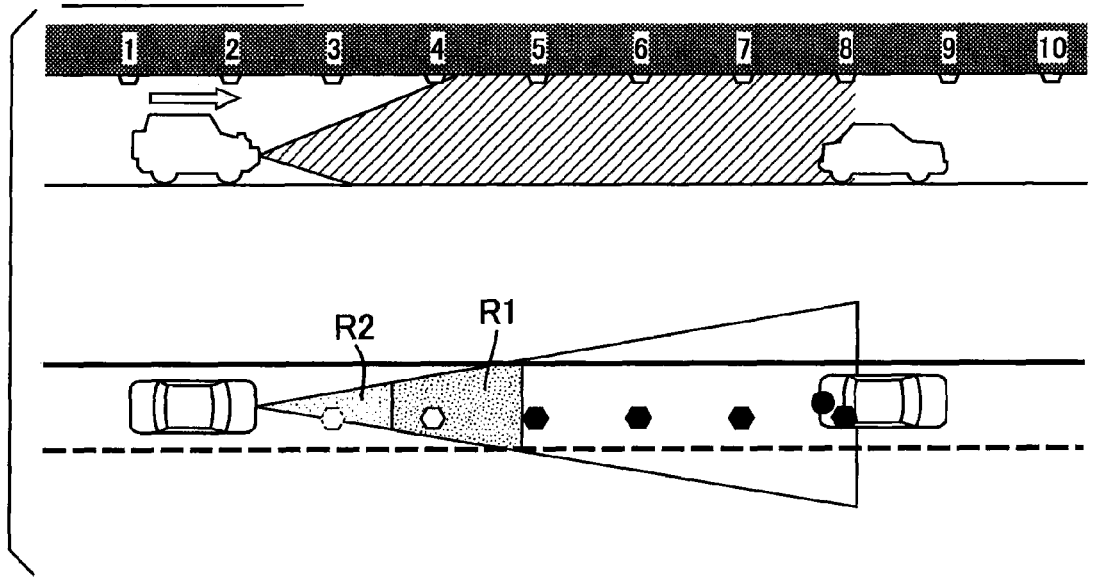
Figure 17B:
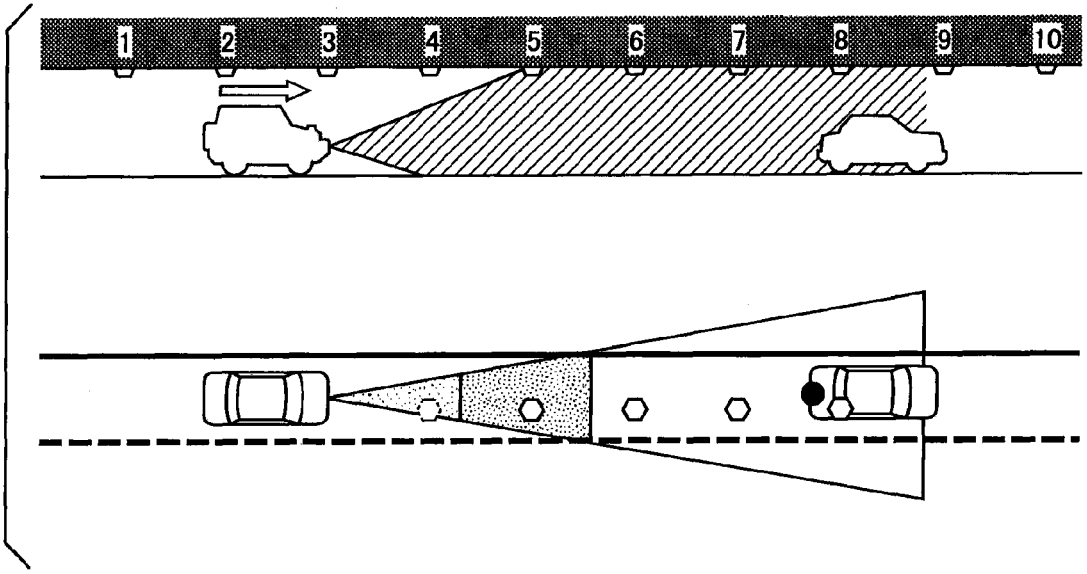
Figure 18A:
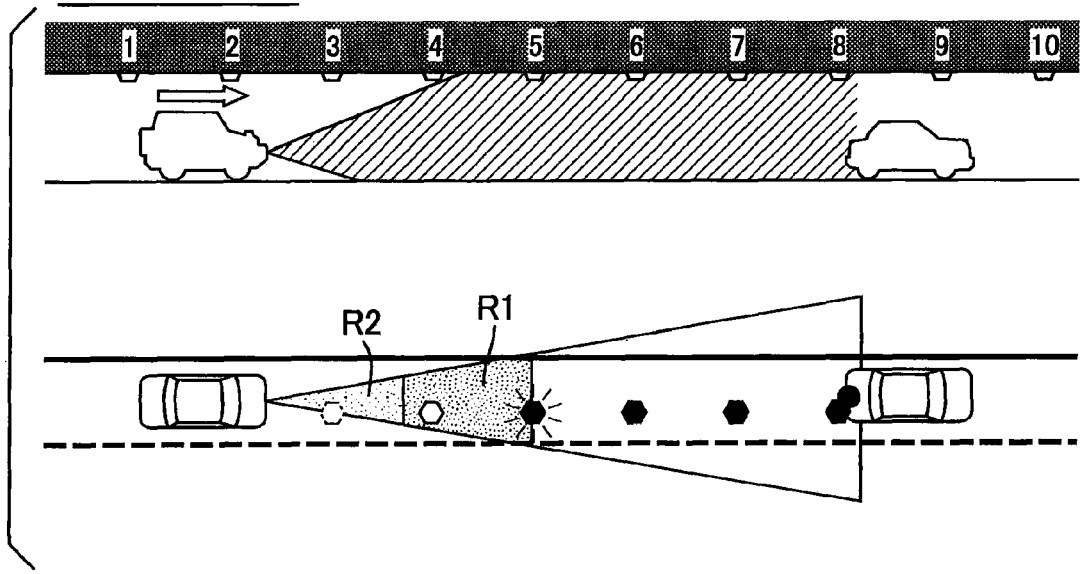
Figure 18B:
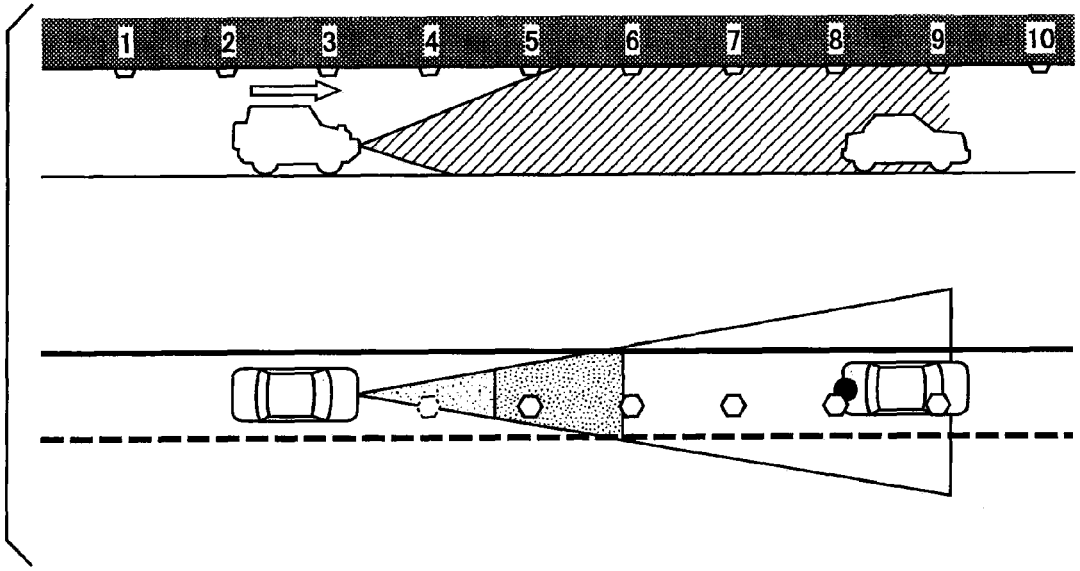
Figure 19A:
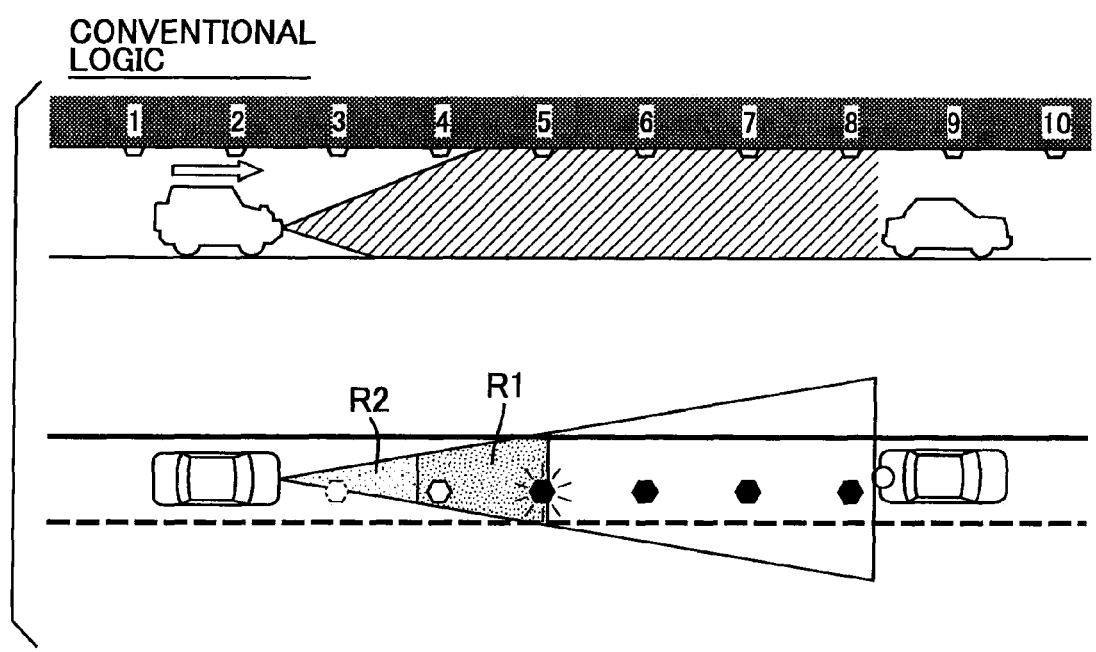
Figure 19B:
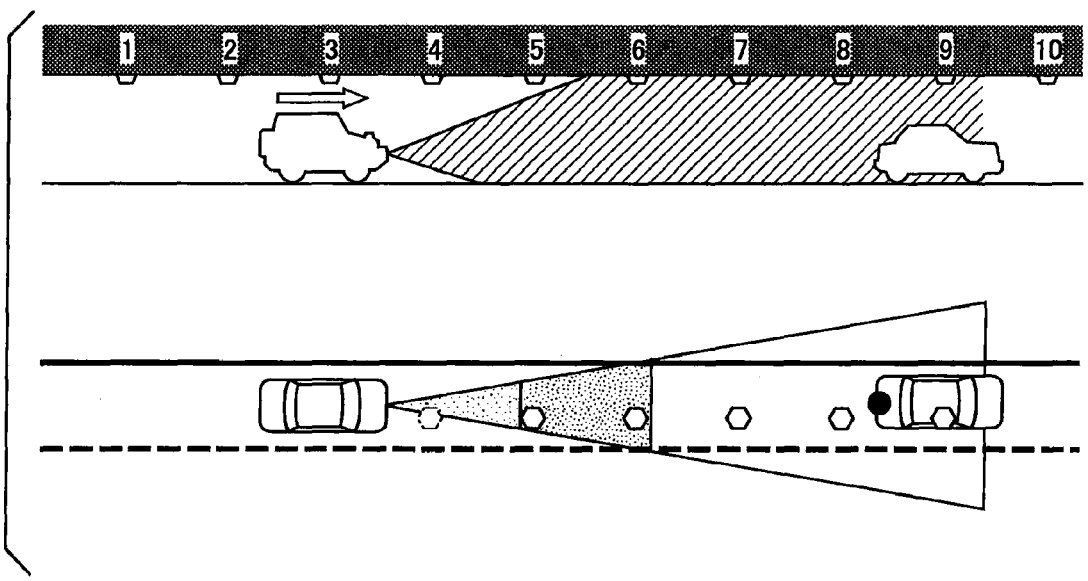

As shown in FIG. 9, the successiveness determination device M8' includes a reference object setting device m1, a first close object determination device m2, a positional relationship calculator m3, a predicted position setting device m4, and a second close object determination device m5.

The object detection device M1 compares a reflection level of the reflected wave received by the receiver Rb in the radar device R with a predetermined detection threshold, and detects only an object having a reflection level of a detection threshold or higher. The relative relationship calculator M2 calculates a relative relationship such as a relative position and a relative speed of the subject vehicle and the object on the basis of a detection result of the object detection device M1. The relative relationship prediction device M3 predicts the next relative relationship from the current relative relationship calculated by the relative relationship calculator M2. The identity determination device M4 compares the actual relative relationship calculated this time with the estimated relative relationship predicted this time to determine identity between the object detected last time and the object detected this time. The control target object recognition device M5 determines only an object determined to be an identical object successively a predetermined number of times by the identity determination device M4, as an identical object to be finally a control target (a target of automatic braking or warning), in order to avoid erroneously recognizing a different object as an identical object.

The extrapolation device M6 assumes that a control target that is lost sight of is successively recognized, and estimates extrapolated data from past data of the control target (the relative position and the relative speed) to extrapolate the data over a predetermined number of times (five in the embodiment), when an object that has been recognized as the control target by the control target object recognition device M5 by last time is not recognized as the control target this time, for example, when the object detection device M1 loses sight of the control target. Specifically, the data that is not recognized is assumed to be recognized, and outputted as extrapolated data. Thus, even if the control target cannot be temporarily recognized due to noises or the like, the control can be continued without interruption. Of course, when the control target that is not recognized is again recognized, and identity between the control target recognized again and the extrapolated data is confirmed, the extrapolated data is again transferred to the actual data.

The general maximum number of extrapolation processings by the extrapolation device M6 is five, and if the extrapolated data is not transferred to the actual data after five extrapolations, for example, if the control target changes its direction and disappears from the forward of the subject vehicle, the extrapolated data disappears after five extrapolation processings. The general maximum number of extrapolation processings is five, but if a condition described below is satisfied, the maximum number of extrapolation processings is reduced to two.

The condition is that control targets are stationary objects successively provided at regular intervals such as illumination lamps on a ceiling of a tunnel. Thus, when the stationary object determination device M7 determines that the control targets are the stationary objects, and the successiveness determination device M8' determines that the stationary objects are successively placed at regular intervals, the extrapolation device M6 reduces the maximum number of extrapolations from five to two.

The vehicle controller M9 controls activation of the collision preventing system S or the warning unit W so as to prevent the subject vehicle from colliding with the control target when the actual data or the extrapolated data of the control target enters a system activation area R1 or a system activation area R2 forward of the subject vehicle.

Specifically, in a conventional example, when a stopping object is lost sight of, extrapolated data is inserted up to five times, while in the embodiment, the successive stopping objects are successively the extrapolated data even during detection, and after the stopping object is actually lost sight of, the number of insertions of the extrapolated data is limited to a maximum of two to prevent unnecessary automatic braking or warning from being performed to provide discomfort to a driver.

Next, an operation of the second embodiment will be described in more detail with reference to flowcharts in FIGS. 22 to 25.

Figure 22:
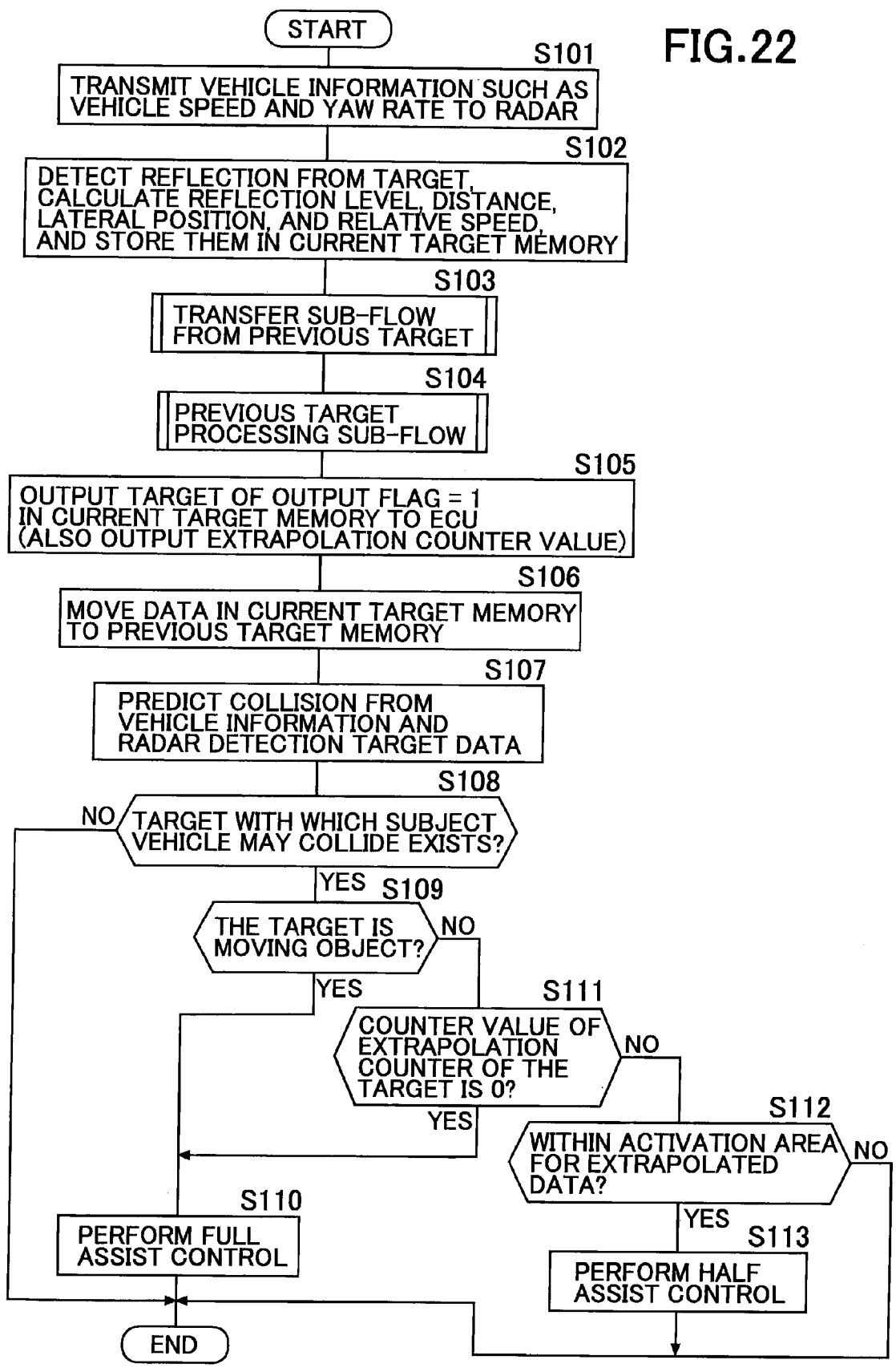

In Step S101 in a main flow in FIG. 22, vehicle data such as a vehicle speed and a yaw rate is obtained, in Step S102, a reflection level, a distance, a lateral position, and a relative speed of a target detected by the radar device R are calculated and stored in the current target memory. Then in Step S103, a transfer sub-flow from the previous target described later is performed, and further in Step S104, a previous target processing sub-flow described later is performed.

Then in Step S105, a target of an output flag=1 (a control target by the collision preventing system S) stored in the current target memory is outputted to the electronic control unit U. At this time, an extrapolation counter value is also outputted. Then in Step S106, data of the current target memory is moved to the previous target memory, and in Step S107, a collision is predicted from vehicle information and radar detection target data When a target with which the subject vehicle may collide exists in Step S108, and the target with which the subject vehicle may collide is a moving object in Step S109, full assist control is performed in Step S110.

On the other hand, when the target with which the subject vehicle may collide is a stopping object in Step S109, and a count value of the extrapolation counter of the target is 0 in Step S111, that is, the target is not extrapolated data, full assist control is performed in Step S110. When the count value of the extrapolation counter of the target is not 0 in Step S111, that is, the target is the extrapolated data and located within an activation area for the extrapolated target (the system activation area R2 for the stopping objects of the actual data and the extrapolated data) in Step S112, half assist control is performed. On the other hand, when the target is not located within the activation area for the extrapolated target (the system activation area R2 for the stopping objects of the actual data and the extrapolated data) in Step S112, the process returns without assist control.

Thus, in the processing of the electronic control unit U, the extrapolated data is also the target of the vehicle control, but the half assist control is performed for the extrapolated data to allow vehicle control according to extrapolated data with lower accuracy than actual data. The half assist control means that the extent of the vehicle control is reduced as compared with that of the full assist control. For example, in automatic braking, deceleration of a braking force is set to be lower than in the full assist, or when both the automatic braking and the warning are used in the full assist, the warning only is performed without the automatic braking.

Figure 23:
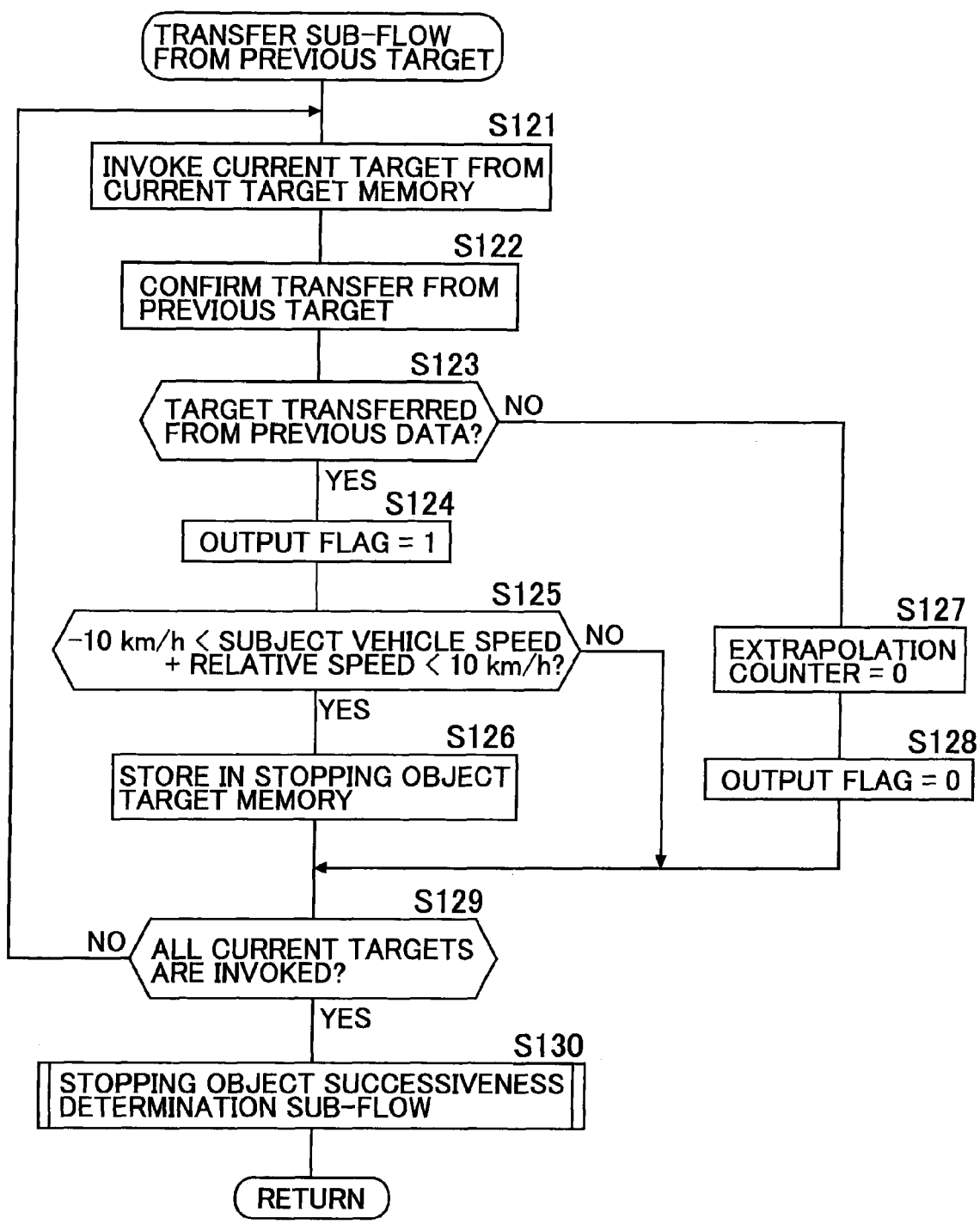

FIG. 23 shows details of Step S103 (the transfer sub-flow from the previous target) in the flowchart in FIG. 22.

First in Step S121, the current target is invoked from the current target memory, and in Step S122, transfer from the previous target is confirmed. The transfer is performed in such a manner that a relative position of the current target is estimated with reference to a relative position of the previous target relative to the subject vehicle position and in view of a relative speed of the previous target, the current target is estimated to be identical to the previous target when the current target exists near the estimated position, and it is determined that the targets are identical for the transfer when this processing is successively performed a predetermined number of times.

Then, when the current target is transferred from and identical to the previous target in Step S123, the output flag is set to 1 in Step S124. Then, in Step S125, it is determined whether the target is a stopping object or a moving object. Specifically, if a subject vehicle speed plus a relative speed is within a range of −10 km/h to 10 km/h, that is, if the target approaches the subject vehicle at a speed of the subject vehicle speed ±10 km/h, it is determined that the target is the stopping object, which is stored in a stopping object memory in Step S126.

When the current target is not transferred from and identical to the previous target in Step S123, the extrapolation counter is set to 0 in Step S127, the output flag is set to 0 in Step S128, and the process moves to Step S129. Also when the target is the moving object in Step S125, the process moves to Step S129. Then, Steps S121 to S128 are repeated until all the current targets are invoked in Step S129. When all the current targets are invoked in Step S129, a stopping object successiveness determination sub-flow is performed in Step S130.

Figure 25:
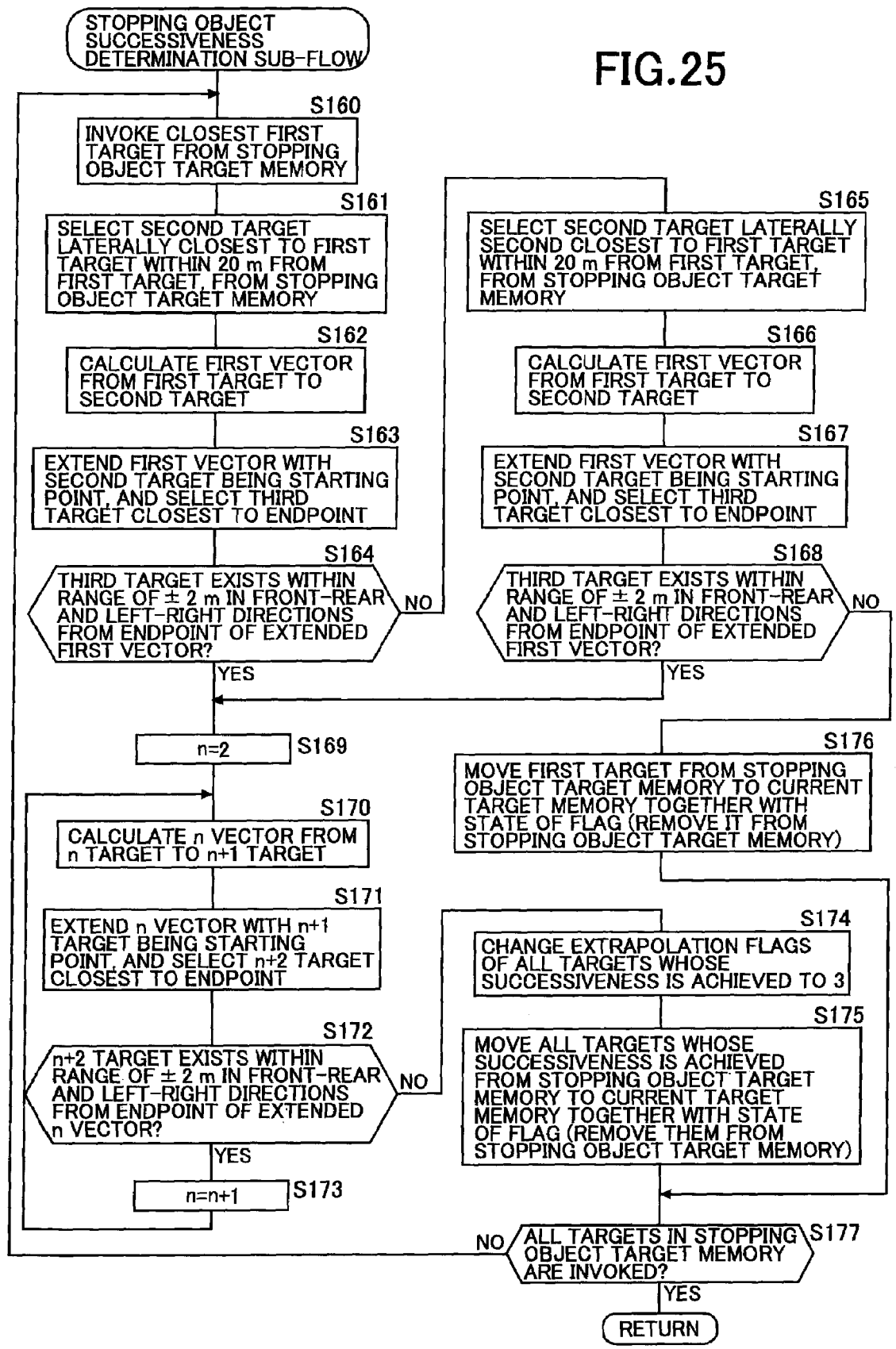

A flowchart in FIG. 25 shows details of the sub-routine (the stopping object successiveness determination sub-flow) in Step S130 in the flowchart in FIG. 23. A determination method of the successive stopping objects by the successiveness determination device M8' will be now described with reference to FIGS. 21A to 21P.

As shown in FIG. 21A and FIG. 21B, a first target that is an illumination lamp closest to the subject vehicle is invoked from a stopping object target memory (Step S160), a line is drawn through the first target in parallel with an advancing direction of the subject vehicle, and within a distance of 20 m from the first target, a second target laterally closest to the line is selected (Step S161). The distance of 20 m is set to be larger than a placement interval of the illumination lamps placed at regular intervals. In this example, three targets at lateral distances of a, b and c are shown, and among them, the target at the distance c laterally closest to the line is selected as the second target.

Then, as shown in FIG. 21C, a first vector is drawn from the first target to the second target (Step S162), then as shown in FIG. 21D, the first vector is moved so that the second target is a starting point, and as shown in FIG. 21E, a third target closest to an endpoint of the moved first vector is selected (Step S163). At this time, it is determined whether the third target exists within an area of 4 m×4 m, ±2 m in the front-rear and left-right directions with reference to the endpoint of the first vector. In this case, the target does not exist within the area ("No" in Step S164), and thus as shown in FIG. 21F, returning to the processing in FIG. 21B, a target laterally second closest to the line is newly selected as a second target (Step S165).

Then as shown in FIG. 21G, a first vector is drawn from the first target to the new second target (Step S166), then as shown in FIG. 21H, the first vector is moved so that the second target is a starting point, and as shown FIG. 21I, a third target closest to an endpoint of the moved first vector is selected (Step S167). At this time, it is determined whether the third target exists within an area of 4 m×4 m, ±2 m in the front-rear and left-right directions with reference to the endpoint of the first vector. In this case, the target exists in the area ("Yes" in Step S168), and thus in FIG. 21J, a second vector is drawn from the second target to the third target (Steps S169 and S170), and in FIG. 21K, the processings (8) and (9) are repeated with the third target being a starting point until successiveness is not achieved (Steps S170 to S173).

Thus, in the embodiment, as shown in FIG. 21L, successiveness of five targets (illumination lamps) is achieved, and extrapolation flags of the targets are changed from 0 as general to 3, moved to the current memory, and removed from the stopping object memory (Steps S174 and S175). Then, as shown in FIG. 21M, the processings (2) to (10) are performed for the remaining targets (poles of a guardrail), and as shown in FIG. 21N, extrapolation flags of four targets whose successiveness is achieved are changed from 0 as general to 3, moved to the current memory, and removed from the stopping object memory. As shown in FIG. 21O, the processings (2) to (13) are repeated until successiveness is not achieved, and in this example, one target (a fire hydrant) remains, and the determination is finished (Step S177).

When the third target does not exist within the area of 4 m×4 m, ±2 m in the front-rear and left-right directions with reference to the endpoint of the first vector in Step S168, in Step S176, the first target is moved from the stopping object memory to the current target memory together with the state of the flag, and removed from the stopping object memory.

Thus, as shown in FIG. 21P, among the stopping objects, for the illumination lamps and the poles of the guardrail as successive objects, the extrapolation counter is 3, and for the fire hydrant as a single object, the extrapolation counter is still 0.

The operation of the successiveness determination device M8' will be summarized. When the reference object setting device m1 sets the first target (reference object) from the plurality of stationary objects determined by the stationary object determination device M7, the first close object determination device m2 determines, as the second target (first close object), an object within a predetermined distance from the reference object in a width direction of the subject vehicle. Then, when the positional relationship calculator m3 calculates a vector from the first target to the second target and the predicted position setting device m4 sets a predicted position where a third target succeeding to the second target is predicted to exist on the basis of the vector, the second close object determination device m5 determines, as the third target, an object closest to the predicted position among objects existing in a predetermined range set on the basis of the predicted position. When the third target is thus determined, it can be determined that the first to third targets are successive.

The successiveness determination device M8' can determine successiveness of a stopping object on a curved road as well as a straight road, also determine successiveness of different stopping objects such as illumination lamps or poles of a guardrail by identifying the objects without confusion, and do not erroneously determine a single object as successive objects.

Figure 24:
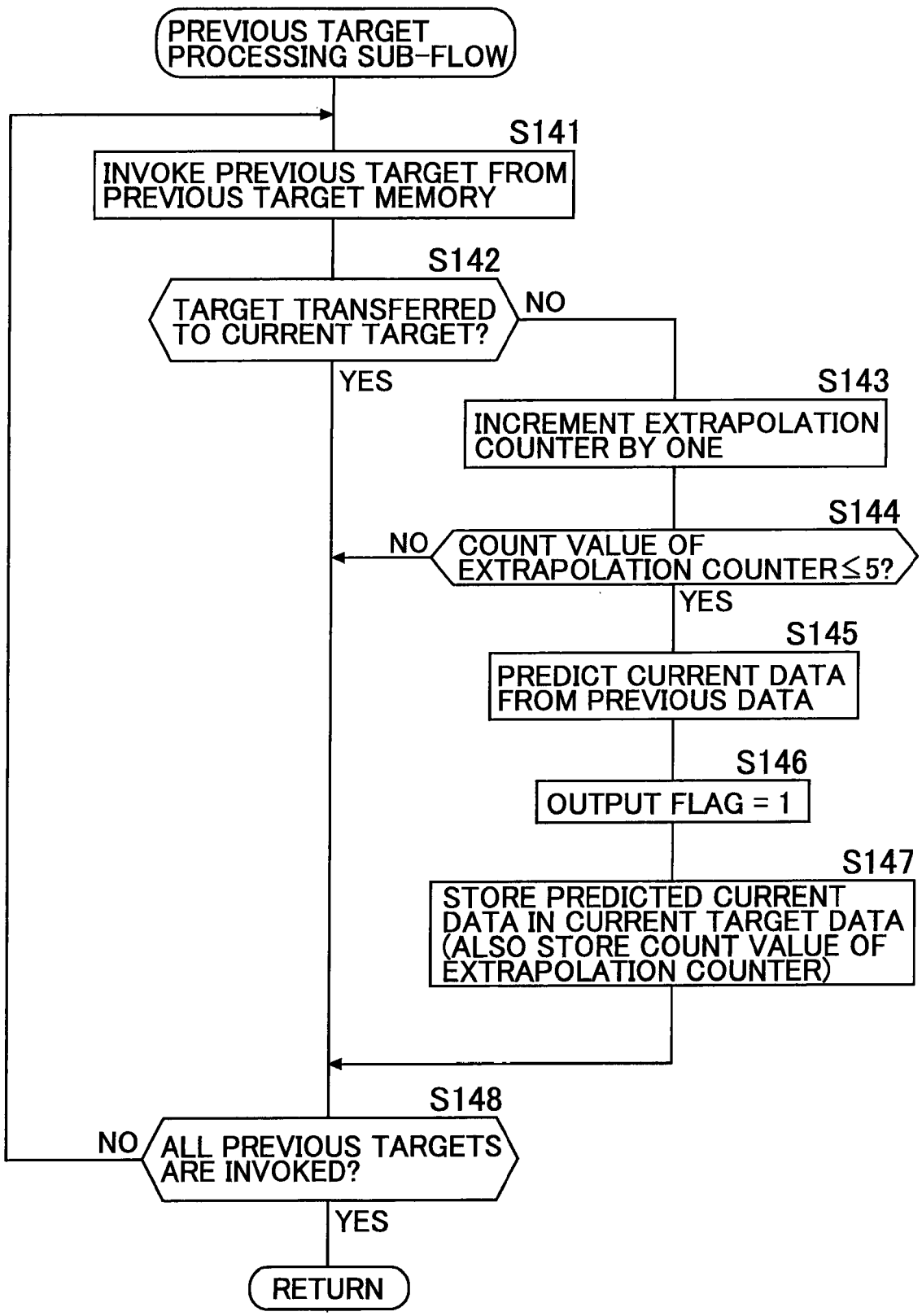

FIG. 24 shows details of Step S104 (the previous target processing sub-flow) in the flowchart in FIG. 22.

First in Step S141, the previous target is invoked from the previous target memory, and in Step S142, when the invoked previous target is not the target transferred to the current target, that is, the extrapolated target, the extrapolation counter is incremented by one in Step S143. When the count value of the extrapolation counter is 5 or less in Step S144, in Step S145, the current data is predicted from the previous data, that is, the current position is predicted from the previous position of the target, and in Step S146, the output flag is set to 1 so that the target becomes the control target of the collision preventing system S. Then in Step S147, the predicted current data is stored in the current target data, and the count value of the extrapolation counter is also stored.

When the invoked previous target is the target transferred to the current target in Step S142, the count value of the extrapolation counter is 6 or more in Step S144, and Step S147 is passed through, Steps S141 to S147 are repeated until all the previous-targets are invoked in Step S148.

As described above, for the stopping objects successively provided at regular intervals such as the illumination lamps on a ceiling of a tunnel, the extrapolation counter is forcedly set to 3 in Step S174 in the flowchart in FIG. 25, and thus the extrapolation counter becomes 5 by two extrapolations fewer than general five extrapolations, and further extrapolations are not performed and data disappears. Thus, the extrapolated data does not exist in the system activation area R2 for the stopping objects of the actual data and the extrapolation data, thereby preventing unnecessary vehicle control such as automatic braking or warning for the illumination lamps as the control targets.

This will be described with reference to FIGS. 10B to 20B. In the system operation area R1 for the stopping object of the actual data, no actual data exist, and in the system activation area R2 for the stopping objects of the actual data and the extrapolated data, neither actual data nor extrapolated data exist, thereby preventing unnecessary vehicle control such as automatic braking or warning for the illumination lamps as the control targets.

The stopping objects with successiveness become the extrapolation data with the extrapolation counter being 3 even if they are the actual data. Thus, the system is not activated even if the target is located within the system activation area R1, and thus excessive vehicle control can be suppressed. The target also becomes the extrapolation target even within the system activation area R2, and half assist can be performed to reduce the influence on the vehicle.

The embodiments of the present invention have been described, and various design changes may be made without departing from the gist of the invention.

For example, the general number of extrapolations and the reduced number of extrapolations are not limited to those in the embodiments, but may be set to any numbers. To cite an example, the number of extrapolation processings when the reflection level is lower than the detection threshold may be reduced from three as general to two, and to one with increase in vehicle speed of the subject vehicle. This can prevent that extrapolated data enters a system activation area before stopping extrapolation due to a high vehicle speed, causing excessive vehicle control to provide discomfort to the driver.

In Steps S164, S168 and S172 in the flowchart in FIG. 22, the area ±2 m in front-rear and left-right directions is set at the endpoint of the vector, but the area may be larger with increase in length of the vector. Thus, detection accuracy of the object detection device M1 that is lower for a longer distance can be compensated.

What is claimed is:

1. A control target recognition system comprising:
   a transmitter for transmitting electromagnetic waves toward a predetermined detection area at a predetermined time interval;
   a receiver for receiving reflected waves that are the electromagnetic waves transmitted by the transmitter and reflected by an object;
   an object detection device for detecting the object on the basis of a reflected wave having a reflection level of a detection threshold or higher among the reflected waves received by the receiver;
   a relative relationship calculator for calculating a relative relationship between a subject vehicle and the object on the basis of a detection result of the object detection device;
   a relative relationship prediction device for predicting a current relative relationship on the basis of the relative relationship calculated last time by the relative relationship calculator;
   an identity determination device for comparing the relative relationship predicted this time by the relative relationship prediction device with the relative relationship calculated this time by the relative relationship calculator, and determining that an object detected last time is identical to an object detected this time;
   a control target object recognition device for recognizing, as a control target object, an object when the object is determined to be identical by the identity determination device a predetermined number of times;
   an extrapolation device for assuming that the object predicted by the relative relationship prediction device is actually detected and extrapolating the object up to a predetermined number of times, when an object that has been recognized as a control target by the control target object recognition device by last time is not recognized as the control target this time;
   a stationary object determination device for determining whether the object recognized as the control target is a stationary object; and
   a reflection level prediction device for predicting a reflection level of the object recognized as the control target at a next detection from a reflection level at a previous detection and a reflection level at a current detection;
   wherein the extrapolation device reduces the limit of the number of extrapolations when the object is the stationary object, and when the predicted reflection level is lower than the detection threshold.

2. The control target recognition system according to claim 1, wherein the extrapolation device reduces the limit of the number of extrapolations with increase in vehicle speed of the subject vehicle.

3. A control target recognition system comprising:
a transmitter for transmitting electromagnetic waves toward a predetermined detection area at a predetermined time interval;
a receiver for receiving reflected waves that are the electromagnetic waves transmitted by the transmitter and reflected by an object;
an object detection device for detecting the object on the basis of a reflected wave having a reflection level of a detection threshold or higher among the reflected waves received by the receiver;
a relative relationship calculator for calculating a relative relationship between a subject vehicle and the object on the basis of a detection result of the object detection device;
a relative relationship prediction device for predicting a current relative relationship on the basis of the relative relationship calculated last time by the relative relationship calculator;
an identity determination device for comparing the relative relationship predicted this time by the relative relationship prediction device with the relative relationship calculated this time by the relative relationship calculator, and determining that an object detected last time is identical to an object detected this time;
a control target object recognition device for recognizing, as a control target object, an object when the object is determined to be identical by the identity determination device a predetermined number of times;
an extrapolation device for assuming that the object predicted by the relative relationship prediction device is actually detected and extrapolating the object up to a predetermined number of times, when an object that has been recognized as a control target by the control target object recognition device by last time is not recognized as the control target this time;
a vehicle controller for controlling the vehicle on the basis of the relative relationship, and changing details of the control according to whether the object recognized as the target object is the actually detected object or the extrapolated object;
a stationary object determination device for determining whether the object recognized as the control target is a stationary object; and
a reflection level prediction device for predicting a reflection level of the object recognized as the control target at a next detection from a reflection level at a previous detection and a reflection level at a current detection;
wherein the extrapolation device determines the object, which is recognized as the control target this time, as an extrapolated object when the object is the stationary object, and the predicted reflection level is lower than the detection threshold, and the vehicle controller reduces an extent of the vehicle control for the extrapolated object as compared with that of the vehicle control for the actually detected object.

4. A control target recognition system comprising:
a transmitter for transmitting electromagnetic waves toward a predetermined detection area at a predetermined time interval;
a receiver for receiving reflected waves that are the electromagnetic waves transmitted by the transmitter and reflected by an object;
an object detection device for detecting the object on the basis of a reflected wave having a reflection level of a detection threshold or higher among the reflected waves received by the receiver;
a relative relationship calculator for calculating a relative relationship between a subject vehicle and the object on the basis of a detection result of the object detection device;
a relative relationship prediction device for predicting a current relative relationship on the basis of the relative relationship calculated last time by the relative relationship calculator;
an identity determination device for comparing the relative relationship predicted this time by the relative relationship prediction device with the relative relationship calculated this time by the relative relationship calculator, and determining that an object detected last time is identical to an object detected this time;
a control target object recognition device for recognizing, as a control target object, an object when the object is determined to be identical by the identity determination device a predetermined number of times;
an extrapolation device for assuming that the object predicted by the relative relationship prediction device is actually detected and extrapolating the object up to a predetermined number of times, when an object that has been recognized as a control target by the control target object recognition device by last time is not recognized as the control target this time;
a vehicle controller for controlling the vehicle on the basis of the relative relationship, and changing timing of carrying out the control according to whether the object recognized as the target object is the actually detected object or the extrapolated object;
a stationary object determination device for determining whether the object recognized as the control target is a stationary object; and
a reflection level prediction device for predicting a reflection level of the object recognized as the control target at a next detection from a reflection level at a previous detection and a reflection level at a current detection;
wherein the extrapolation device determines the object, which is recognized as the control target this time, as an extrapolated object when the object is the stationary object, and the predicted reflection level is lower than the detection threshold, and the vehicle controller reduces a chance of the vehicle control for the extrapolated object as compared with that of the vehicle control for the actually detected object.

5. A vehicle object detection system comprising:
a transmitter for transmitting electromagnetic waves toward a predetermined detection area at a predetermined time interval;
a receiver for receiving reflected waves that are the electromagnetic waves transmitted by the transmitter and reflected by an object;
an object detection device for detecting the object on the basis of a reflected wave having a reflection level of a detection threshold or higher among the reflected waves received by the receiver;
a relative relationship calculator for calculating a relative relationship between a subject vehicle and the object on the basis of a detection result of the object detection device;
a relative relationship prediction device for predicting a current relative relationship on the basis of the relative relationship calculated last time by the relative relationship calculator;
an identity determination device for comparing the relative relationship predicted this time by the relative relationship prediction device with the relative relationship calculated this time by the relative relationship calculator, and determining that an object detected last time is identical to an object detected this time;

a control target object recognition device for recognizing, as a control target object, an object when the object is determined to be identical by the identity determination device a predetermined number of times;

an extrapolation device for assuming that the object predicted by the relative relationship prediction device is actually detected and extrapolating the object up to a predetermined number of times, when an object that has been recognized as a control target by the control target object recognition device by last time is not recognized as the control target this time; and a vehicle controller for controlling the vehicle on the basis of the relative relationship, and changing details of the control according to whether the object recognized as the target object is the actually detected object or the extrapolated object;

wherein the system further comprises:

a stationary object determination device for determining whether the object recognized as the control target is a stationary object; and a successiveness determination device for determining, when a plurality of stationary objects exist, whether the plurality of stationary objects are successive at substantially regular intervals, and the extrapolation device determines the actually detected stationary objects as extrapolated objects when it is determined that the stationary objects are successive, and the vehicle controller reduces an extent of the vehicle control for the extrapolated objects as compared with that of the vehicle control for the actually detected objects.

6. A vehicle object detection system comprising:

a transmitter for transmitting electromagnetic waves toward a predetermined detection area at a predetermined time interval;

a receiver for receiving reflected waves that are the electromagnetic waves transmitted by the transmitter and reflected by an object;

an object detection device for detecting the object on the basis of a reflected wave having a reflection level of a detection threshold or higher among the reflected waves received by the receiver;

a relative relationship calculator for calculating a relative relationship between a subject vehicle and the object on the basis of a detection result of the object detection device;

a relative relationship prediction device for predicting a current relative relationship on the basis of the relative relationship calculated last time by the relative relationship calculator;

an identity determination device for comparing the relative relationship predicted this time by the relative relationship prediction device with the relative relationship calculated this time by the relative relationship calculator, and determining that an object detected last time is identical to an object detected this time;

a control target object recognition device for recognizing, as a control target object, an object when the object is determined to be identical by the identity determination device a predetermined number of times; and an extrapolation device for assuming that the object predicted by the relative relationship prediction device is actually detected and extrapolating the object up to a predetermined number of times, when an object that has been recognized as a control target by the control target object recognition device by last time is not recognized as the control target this time; and a vehicle controller for controlling the vehicle on the basis of the relative relationship, and changing timing of carrying out the control according to whether the object recognized as the target object is the actually detected object or the extrapolated object;

wherein the system further comprises:

a stationary object determination device for determining whether the object recognized as the control target is a stationary object; and a successiveness determination device for determining, when a plurality of stationary objects exist, whether the plurality of stationary objects are successive at substantially regular intervals, and the extrapolation device determines the actually detected stationary objects as extrapolated objects when it is determined that the stationary objects are successive, and the vehicle controller reduces a chance of the vehicle control for the extrapolated object as compared with that of the vehicle control for the actually detected object.

7. A vehicle object detection system comprising:

a transmitter for transmitting electromagnetic waves toward a predetermined detection area at a predetermined time interval;

a receiver for receiving reflected waves that are the electromagnetic waves transmitted by the transmitter and reflected by an object;

an object detection device for detecting the object on the basis of a reflected wave having a reflection level of a detection threshold or higher among the reflected waves received by the receiver;

a relative relationship calculator for calculating a relative relationship between a subject vehicle and the object on the basis of a detection result of the object detection device;

a relative relationship prediction device for predicting a current relative relationship on the basis of the relative relationship calculated last time by the relative relationship calculator;

an identity determination device for comparing the relative relationship predicted this time by the relative relationship prediction device with the relative relationship calculated this time by the relative relationship calculator, and determining that an object detected last time is identical to an object detected this time;

a control target object recognition device for recognizing, as a control target object, an object when the object is determined to be identical by the identity determination device a predetermined number of times; and an extrapolation device for assuming that the object predicted by the relative relationship prediction device is actually detected and extrapolating the object up to a predetermined number of times, when an object that has been recognized as a control target by the control target object recognition device by last time is not recognized as the control target this time;

wherein the system further comprises:

a stationary object determination device for determining whether the object recognized as the control target is a stationary object; and a successiveness determination device for determining, when a plurality of stationary objects exist, whether the plurality of stationary objects are successive at substantially regular intervals;

wherein if it is determined that the stationary objects are successive, the extrapolation device reduces the number of extrapolations when the object that has been detected is out of detection and becomes an extrapolated object.

8. The vehicle object detection system according to any one of claims 5 to 7, wherein the successiveness determination device includes:
a reference object setting device for setting a reference object of the plurality of stationary objects determined by the stationary object determination device;
a first close object determination device for determining, as a first close object, an object within a predetermined distance from the reference object in a width direction of the subject vehicle;
a positional relationship calculator for calculating a distance between the reference object and the first close object and a direction of the first close object with respect to the reference object;
a predicted position setting device for setting a predicted position where a second close object close to the first close object is predicted to exist on the basis of the distance and the direction calculated by the positional relationship calculator; and
a second close object determination device for determining, as a second close object, an object closest to the predicted position among objects that exist in a predetermined range set on the basis of the predicted position; and
the successiveness determination device determines that the reference object, the first close object and the second close object are successive when the second close object is determined.

9. The vehicle object detection system according to claim 8, wherein the predetermined range is set according to the distance between the reference object and the first close object.

* * * * *